United States Patent
Koseki et al.

(10) Patent No.: US 6,947,074 B2
(45) Date of Patent: Sep. 20, 2005

(54) IMAGE PICKUP APPARATUS

(75) Inventors: Hiroaki Koseki, Kokubunji (JP); Kuniaki Saito, Tokorozawa (JP)

(73) Assignee: Olympus Corporation, Tokyo (JP)

( * ) Notice: Subject to any disclaimer, the term of this patent is extended or adjusted under 35 U.S.C. 154(b) by 632 days.

(21) Appl. No.: 10/120,469

(22) Filed: Apr. 11, 2002

(65) Prior Publication Data

US 2002/0154912 A1 Oct. 24, 2002

(30) Foreign Application Priority Data

Apr. 13, 2001 (JP) ........................................ 2001-115885

(51) Int. Cl.[7] .............................................. H04N 3/08
(52) U.S. Cl. ................................................. 348/204.1
(58) Field of Search ........................ 348/240.1, 240.99, 348/240.2, 240.3, 308, 302, 333.03; 396/429

(56) References Cited

U.S. PATENT DOCUMENTS

| | | | | |
|---|---|---|---|---|
| 4,858,020 | A | * | 8/1989 | Homma .................... 348/240.2 |
| 4,910,599 | A | * | 3/1990 | Hashimoto ............... 348/240.2 |
| 6,181,375 | B1 | * | 1/2001 | Mitsui et al. .......... 348/240.99 |
| 2001/0040630 | A1 | | 11/2001 | Matsuzaka |
| 2002/0018136 | A1 | * | 2/2002 | Kaji et al. ................ 348/240 |
| 2002/0050518 | A1 | * | 5/2002 | Roustaei .................... 235/454 |
| 2002/0154912 | A1 | * | 10/2002 | Koseki et al. ............. 396/429 |
| 2002/0158973 | A1 | * | 10/2002 | Gomi ...................... 348/240.2 |

FOREIGN PATENT DOCUMENTS

| | | |
|---|---|---|
| EP | 0 926 885 A2 | 6/1999 |
| EP | 1 024 659 A2 | 8/2000 |
| JP | 05-232372 | 9/1993 |
| JP | 10-042183 | 2/1998 |
| JP | 2000-295530 | 10/2000 |

OTHER PUBLICATIONS

Office Action dated Aug. 9, 2004 from the European Patent Office for European Patent Application No. EP 02 007 768.1.

* cited by examiner

*Primary Examiner*—Aung Moe
(74) *Attorney, Agent, or Firm*—Straub & Pokotylo; John C. Pokotylo

(57) ABSTRACT

An image pickup apparatus includes a lens as an image pickup optical system having a zooming function, an X-Y address type image pickup device in which a reading position in a two-dimensionally arranged pixels is designated by a combination of an X address and a Y address, an image pickup device driver which performs electronic zooming by changing an address range which is a combination of a range designated by the X address and a range designated by the Y address, and a digital processor which provides a substantially wider zoom range by controlling the electronic zooming and optical zooming in combination than by controlling one of the electronic zooming and the optical zooming.

22 Claims, 15 Drawing Sheets

FIG.5A

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 A | 29 B | 30 | 31 | 32 |
| 33 | 34 | 35 | 36 C | 37 D | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

| D | C | B | A |
|---|---|---|---|

FIG.5C

| A | B |
|---|---|
| C | D |

|   |   |   |   |   |   |   |   |   |   |   |   |
|---|---|---|---|---|---|---|---|---|---|---|---|
| 1 | 2 | 3 | 4 | 5 | 6 | 7 | 8 | 9 | 10 | 11 | 12 |
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |

FIG.18B

|   |   |   |   |   |   |   |   |   |   |   |   |
|---|---|---|---|---|---|---|---|---|---|---|---|
| 1 | 2 | 3 | 4 | 5 | 6 | 7 | 8 | 9 | 10 | 11 | 12 |
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |

IMAGE PICKUP APPARATUS

This application claims benefit of Japanese Application No. 2001-115885 filed on Apr. 13, 2001, the contents of which are incorporated by this reference.

BACKGROUND OF THE INVENTION

1. Field of the Invention

The present invention relates to an image pickup apparatus and, more particularly, to an image pickup apparatus that combines electronic zooming and optical zooming.

2. Description of the Related Art

A variety of image pickup apparatuses that photoelectrically convert the image of a subject image into a video signal through an image pickup device have been proposed. The image pickup apparatuses find widespread use ranging from digital cameras and video cameras to the one for picking up an image observed by a microscope, and to the one for picking up an image viewed through an endoscope.

The images picked up by such an image pickup apparatus are chiefly categorized into two types, namely, still pictures and moving pictures. Still pictures are obtained by taking one frame of video data only and moving pictures are obtained by successively taking a plurality of frames of picture data. Electronic cameras proposed take both a still picture and a moving picture.

The electronic cameras today have a number of pixels as many as several millions, for example, and take a high-definition still picture. In the meantime, when a moving picture is handled, such a camera displays a picture on a display element of several tens of thousands to several hundreds of thousands of pixels or sometimes stores the moving picture together with the still picture in a storage medium with a limited storage capacity. Therefore, an electronic camera having a resolution of several hundreds of thousands of pixels works enough for taking such pictures. Pixel information read from an image pickup device is thus skip-read out or interpolated to create image data for use as a moving picture.

An image pickup apparatus such as the electronic camera incorporates an optical zoom which varies the size of the image of a subject focused on the image pickup device using an optical system having a variable focal length, and an electronic zoom which varies an output angle of field of a picture signal which is consequently output by clipping a image formed on the image pickup device.

One image pickup apparatus having an electronic zoom is disclosed in Japanese Unexamined Patent Application Publication No. 2000-295530. The disclosed image pickup apparatus is a solid-state image pickup apparatus having two-dimensionally arranged, photoelectrical converter elements, which are accessed in a random fashion during operation. The image pickup apparatus includes a first skipping unit for reading data of any designated pixels, and a second skipping unit for reading data of an area of pixels smaller than the picture frame read by the first skipping unit. The pixels read by the first skipping unit and the pixels read by the second skipping unit are equalized.

Another image pickup apparatus is disclosed in Japanese Unexamined Patent Application Publication No. 10-42183. The disclosed image pickup apparatus includes a first adjusting unit for optically adjusting the angle of view of an image, a second adjusting unit for electronically adjusting the angle of view of the image, and a controller for determining the angle of view by controlling the first adjusting unit and the second adjusting unit. The controller controls the angle of view to an angle of view desired by a user through the second adjusting unit, and then transfers control of the angle of view to the first adjusting unit from the second adjusting unit while keeping the angle of view. The disclosed image pickup apparatus employs a CCD (Charge-Coupled Device). During an electronic zooming operation, the image pickup apparatus reads data of all pixels using the CCD and stores data in a frame memory, and then electronically interpolates the data in accordance with a pixel signal of a smaller number of pixels contained in an area within the entire angle of view, thereby resulting in an output image having a desired angle view.

Japanese Unexamined Patent Application Publication No. 5-232372 discloses a camera having a line-of-sight detector. The disclosed camera includes a light projector for projecting luminous fluxes in a plurality of directions, a range finder including a photoreceiver for receiving light rays reflected from subject images to which the luminous fluxes are projected, and for outputting a signal into which the received light rays are photoelectrically converted, the range finder thus range finding a plurality of range finding areas based on the photoelectrical output signal, a line-of-sight detector for detecting the line of sight of a photographer to determine what direction the photographer looks to in the range finder, and a lens controller for controlling a photographing lens based on the output of the range finder in accordance with the sight line provided by the line-of-sight detector. During a light projection operation by the light projector, the line-of-sight detector detects the line of sight of the photographer in the directions in which light is projected.

In the image pickup apparatus disclosed in Japanese Unexamined Patent Application Publication No. 2000-295530, the electronic zooming is performed by varying a skip amount during reading, and discontinuous electronic zooming only is possible. The angle of view cannot be varied in steps of angles finer than the skip amount. The electronic zoom is unable to cover the angle of view in excess of a field of view taken by the image pickup device because the image focused on the image pickup device is clipped.

In the image pickup apparatus disclosed in Japanese Unexamined Patent Application Publication 10-42183, all pixels data needs first to be read using the CCD image pickup device. A high-rate clock corresponding to the number of pixels is thus supplied to the device. To skip-read out the data, information of all pixels needs to be stored into a frame memory. The use of the frame memory gives rise to an increase in cost. Since an interpolation processing is electronically performed on the picture signal based on a small number of pixels, image quality is degraded more as an image is expanded more. The disclosed image pickup apparatus cannot tell whether a subject observed by the user falls within a range by the electronic zoom or a range by the optical zoom, and thus does not provide any indication to discriminate between the range covered by the electronic zoom and the range covered by the optical zoom. Furthermore, since the image pickup apparatus is not provided with any particular switch to switch between the electronic zoom and the optical zoom, the user has no option to select between the electronic zoom and the optical zoom. Even if the user attempts to record a high-definition still picture without using the electronic zoom, the user cannot operate it. No consideration is given to a still picture recording mode intended to take a high-definition still picture.

Japanese Unexamined Patent Application Publication No. 5-232372 further discloses a technique in which the focal length of the imaging lens is modified in response to the detection of the line of sight. No particular consideration is given to the zooming of the photographing lens and the selection between the optical zoom and the electronic zoom.

SUMMARY OF THE INVENTION

Accordingly, it is an object of the present invention to provide an image pickup apparatus that performs a wide range of zooming with a high resolution.

An image pickup apparatus of the present invention having a zoom function, includes an X-Y address type image pickup device which photoelectrically converts an image of a subject image formed by an optical element with two-dimensionally arranged pixels, and outputs a picture signal reading a charge into which the image is photoelectrically converted, the image pickup device designating a position in the two-dimensionally arranged pixels by a combination of an X address and a Y address, an optical zoom unit which performs optical zooming by changing a pickup angle of view which becomes the field of the subject image focused on the image pickup device, an electronic zoom unit which performs electronic zooming by changing a clipping angle of view which is a clipping range of the pickup angle of view, an address range formed of a combination of a range designated by an X address and a range designated by a Y address being changed when the pixels of the image pickup device are read, and a controller which controls a combination of the electronic zooming by the electronic zoom unit and the optical zooming by the optical zoom unit to obtain a zoom range of an output angle of view of a finally output picture signal.

The above and other objects, features and advantages of the invention will become more clearly understood from the following description referring to the accompanying drawings.

BRIEF DESCRIPTION OF THE DRAWINGS

FIGS. 5A to 5C illustrate an electronic zoom in an image pickup device that is an 8 by 8 pixel arrangement model in the telephoto position thereof in the above embodiment, wherein FIG. 5A illustrates the arrangement of the image pickup device, FIG. 5B illustrates pixel data read from the image pickup device, and FIG. 5C illustrates an output image to be displayed or to be recorded;

FIGS. 6A to 6C illustrate an electronic zoom in an image pickup device that is an 8 by 8 pixel arrangement model in the intermediate position thereof in the above embodiment, wherein FIG. 6A illustrates the arrangement of the image pickup device, FIG. 6B illustrates pixel data read from the image pickup device, and FIG. 6C illustrates an output image to be displayed or to be recorded;

FIGS. 7A to 7C illustrate an electronic zoom in an image pickup device that is an 8 by 8 pixel arrangement model in the wide-angle position thereof in the above embodiment, wherein FIG. 7A illustrates the arrangement of the image pickup device, FIG. 7B illustrates pixel data read from the image pickup device, and FIG. 7C illustrates an output image to be displayed or to be recorded;

FIGS. 9A to 9C illustrate a modification of the electronic zoom in an image pickup device that is an 8 by 8 pixel arrangement model in the wide-angle position thereof in the above embodiment, wherein FIG. 9A illustrates the arrangement model of a first area in the image pickup device, FIG. 9B illustrates two pieces of pixel data, which are read from the image pickup device and summed, and FIG. 9C illustrates pixel data read from the first area in the image pickup device;

FIG. 11 illustrates the electronic zoom that selects a first angle of view as an output angle of view when the pickup angle of view is a second angle of view in the above embodiment;

FIG. 12 illustrates the electronic zoom that selects a second angle of view as an output angle of view when the pickup angle of view is the second angle of view in the above embodiment;

FIG. 13 illustrates the electronic zoom that selects a third angle of view as an output angle of view when the pickup angle of view is the third angle of view in the above embodiment;

FIGS. 18A to 18B illustrate that a clipping angle of view is shifted together with the shifting of an optical axis;

DESCRIPTION OF THE PREFERRED EMBODIMENTS

Figure 1:
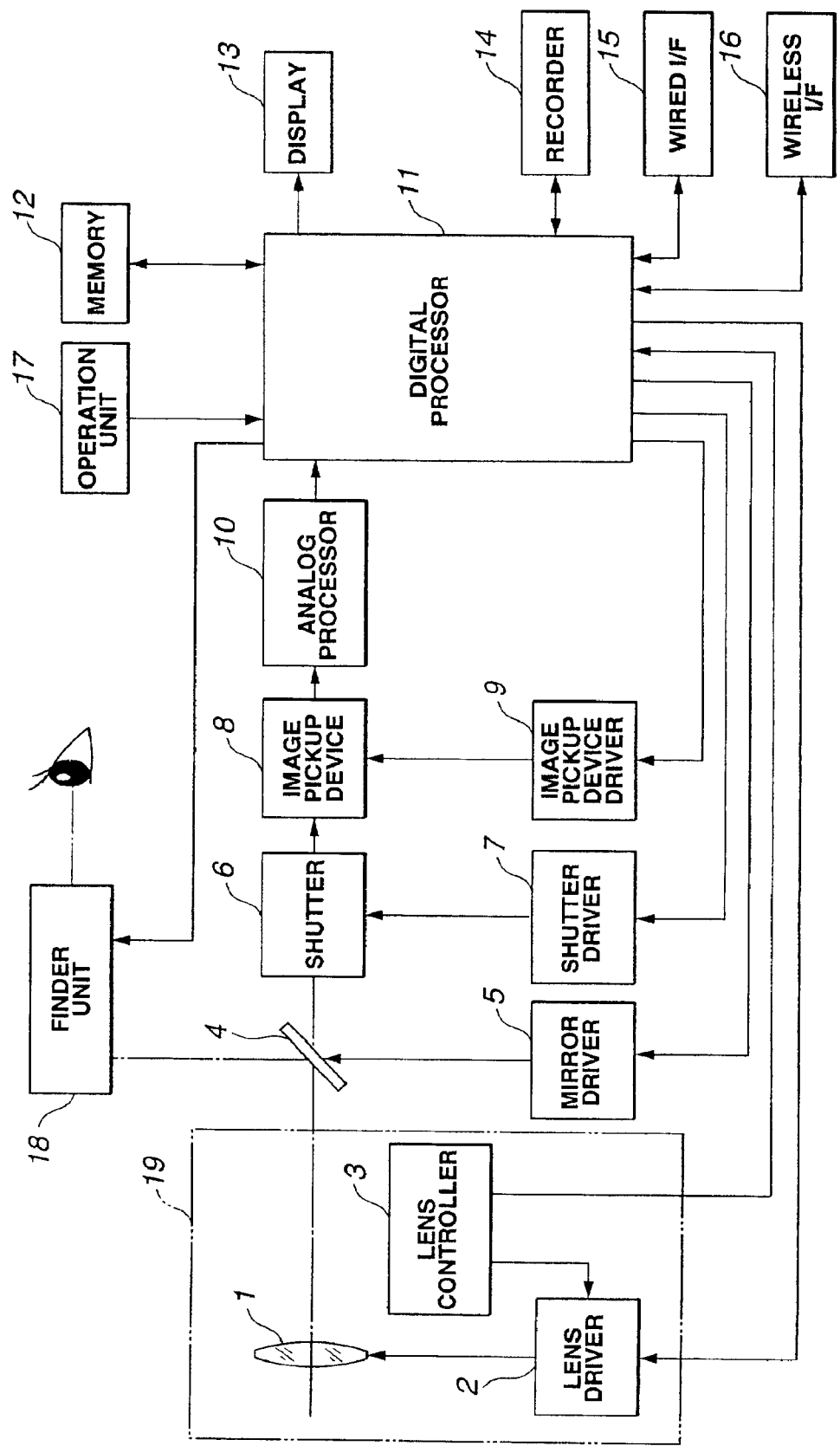
FIG. 1 is a block diagram showing the configuration of an image pickup apparatus in accordance with one embodiment of the present invention.

The embodiments of the present invention are discussed below referring to the drawings.

FIG. 1 through FIG. 24 illustrate one embodiment of the present invention. FIG. 1 is a block diagram illustrating the configuration of an image pickup apparatus.

Referring to FIG. 1, the image pickup apparatus includes a lens unit 19 enclosed in a two dotted chain lined box, a flipping mirror 4, a mirror driver 5, a shutter 6, a shutter driver 7, an image pickup device 8, an image pickup device driver 9, an analog processor 10, a digital processor 11, a memory 12, a recorder 14, a display 13, a wired interface (I/F) 15, a wireless interface (I/F) 16, an operation unit 17, and a finder unit 18. The lens unit 19 includes a lens 1, a lens driver 2, and a lens controller 3. The lens 1 is an optical element constituting an image pickup optical system and having a zoom capability. The lens driver 2, which is optical zoom means under the control of the digital processor 11 discussed later, drives the lens in a zooming operation and a focusing operation. When being operated, the lens controller 3 as operation means can directly drive the lens 1 thereby sending operation information to the digital processor 11. The flipping mirror 4, arranged in the optical path of a light beam of a subject entered through the lens 1, is flipped to a reflective position thereof in the optical path when the subject is checked prior to photographing. During a photographing operation, the flipping mirror 4 is flipped from the optical path down into a retracted position thereof. The mirror driver 5, under the control of the digital processor 11, drives the flipping mirror 4 to the reflective position or to the retracted position, thereby switching the optical path. With the flipping mirror 4 in the reflective position thereof, the finder unit 18 is arranged to be aligned in the optical path of the light reflected from the subject. The finder unit 18 includes a display device, controlled by the digital processor 11, for displaying information. With the finder unit 18 as an optical finder, the user checks the image of the subject image prior to photographing. The shutter 6 controls the light passing time during which the light of the subject is incident through the lens 1 when the flipping mirror 4 is at the retracted position thereof. The shutter driver 7 drives the shutter 6 to be closed or opened under the control of the digital processor 11. The image pickup device 8 photoelectrically converts the light from the object passing through the shutter 6 into a picture signal and outputs the picture signal. The image pickup device driver 9, which is electronic zoom means controlled by the digital processor 11, drives the image pickup device 8. The analog processor 10 includes circuits such as a noise reducing CDS (correlated double sampling) circuit, a GCA (gain control amplifier), and an ADC (A/D converter) for performing a variety of processings on an analog picture signal output from the image pickup device 8 and outputting a digital picture signal. The digital processor 11 is control means which performs an image processing on a digital picture signal, such as an image synthesis, while controlling other circuits. The memory 12 is storage means which temporarily stores an image processed by the digital processor 11. The display 13 may be a liquid-crystal display (LCD) or an organic EL (electroluminescence) display for presenting the image output from the digital processor 11. The recorder 14 may be a hard disk or a flash memory for recording the image processed by the digital processor 11 in a file format containing header information. The wired interface 15 sends the image processed by the digital processor 11 to an external device through, i.e., a USB (Universal Serial Bus). The wireless interface 16 sends the image processed by the digital processor 11 to an external device through, i.e., a Bluetooth (Trade Mark) link. The operation unit 17 includes a power button for switching on and off power for the image pickup apparatus, a photographing button for inputting an instruction to photograph, and a mode switching button for switching a photographing mode and other modes. When any of theses buttons is pressed, a corresponding signal is fed to the digital processor 11.

The memory 12 is not limited to a standalone type, but may be built in the digital processor 11. A portion of the recorder 14 may be used as the memory 12.

The finder unit 18 is a finder optical unit in a single lens reflex camera. The finder unit 18 forms an image based on a light beam entering through the lens 1 as an imaging optical system on a focusing screen, which is placed at a position optically equivalent to the position of the image pickup device 8. The finder unit 18 then converts an image formed on the focusing screen into an image erected correct way up, and then projects the resulting image to the eyes of the user. The finder unit 18 includes a display device 18f (see FIG. 2), such as a transmissive type LCD, for displaying a variety of pieces of information in the finder field of view. The display device 18f is controlled by the digital processor 11.

Alternatively, the finder unit 18 may be arranged as a finder optical system independent of the imaging optical system. Such a finder optical system is discussed with reference to FIG. 2.

Figure 2:
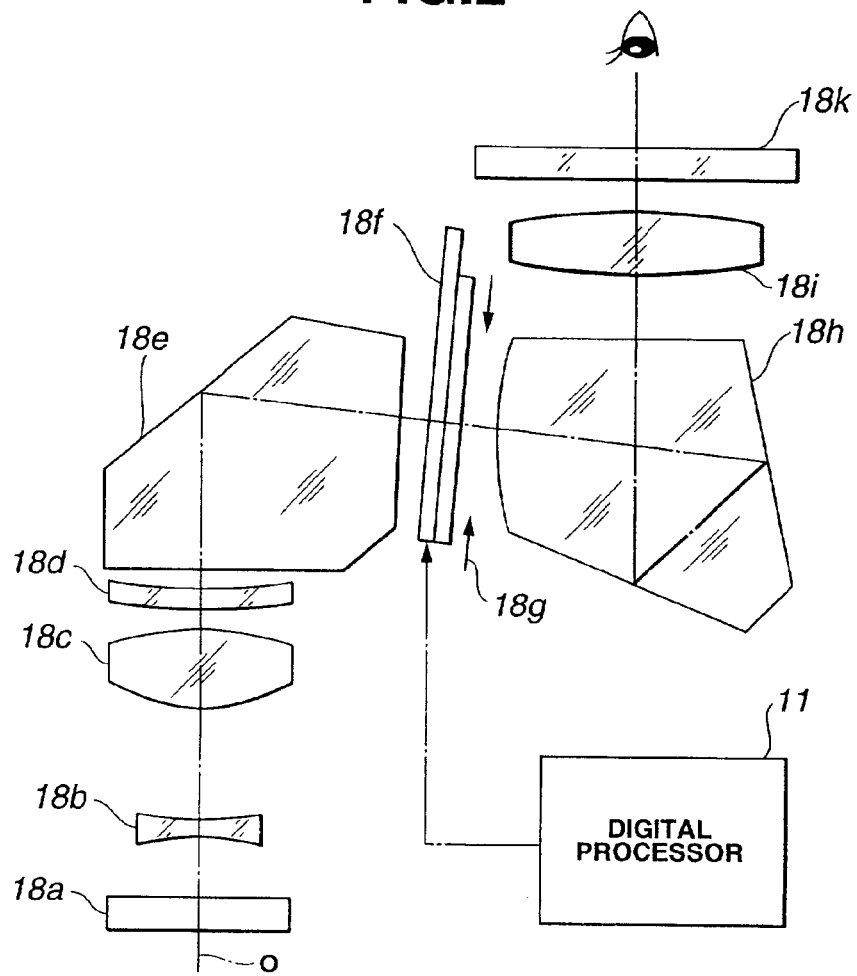
FIG. 2 illustrates in detail the configuration of a finder unit in the embodiment of the present invention.

FIG. 2 illustrates the configuration of the finder unit 18 in detail.

The finder unit 18 is fabricated as a real image finder optical system. The finder unit 18 includes, along the optical path of the finder, an objective window 18a for protecting the finder optical system on the object side, an object lens group which is composed of a first lens 18b, a second lens 18c, and a third lens 18d and also serves as a zoom lens group, a first prism 18e for reflecting a luminous flux transmitted through the object lens group, the display device 18f which is in-finder display means, such as a transmissive LCD, under the control of the digital processor 11, for displaying a variety of pieces of information in a finder field, a field stop 18g for determining the view field of the luminous flux transmitted through the display device 18f, a second prism 18h for further reflecting several times the luminous flux transmitted through the field stop 18g, an eyepiece lens 18i for enlarging and projecting an image bearing light beam output from the second prism 18h to the eyes of the photographer, and an eyepiece window 18k for protecting the finder optical system on the eyepiece end.

The objective lens group, composed of the first lens 18b, the second lens 18c, and the third lens 18d, has the zooming function as already discussed. In linkage with the zooming action of the lens 1 as the image-pickup optical system, the objective lens group is driven under the control of the digital processor 11.

Figure 3A:
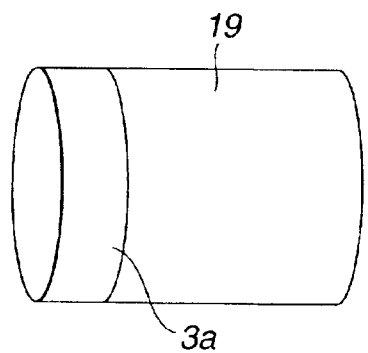
FIG. 3A illustrates a specific arrangement of an operation unit arranged in the image pickup apparatus of the embodiment of the present invention.
Figure 3B:
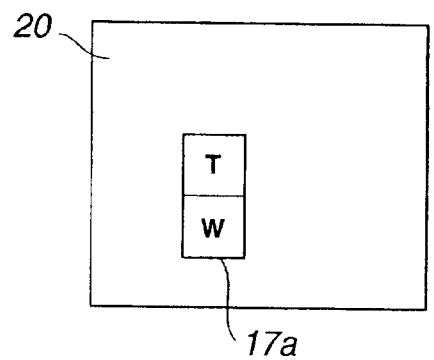
FIG. 3B illustrates another specific arrangement of the operation unit arranged in the image pickup apparatus of the embodiment of the present invention.

FIGS. 3A and 3B illustrate a specific arrangement of an operation unit arranged on the image pickup apparatus.

Referring to FIG. 3A, the lens controller 3 includes a ring-like zooming operation member 3a arranged on the outer periphery of the lens barrel in the lens unit 19.

When being rotated in one direction, the zooming operation member 3a performs a zooming operation toward the telephoto end by a zooming amount corresponding to the amount of rotation thereof. When being rotated in the other direction, the zooming operation member 3a performs a zooming operation toward the wide-angle end by a zooming amount corresponding to the amount of rotation thereof. The information about this operation is fed to the digital processor 11.

The operation unit 17 mounted the body 20 of the image pickup apparatus includes a zooming operation member 17a. The zooming operation member 17a is a lever-like member which is pressed to select alternatively between the telephoto side (labeled T) thereof and the wide-angle side (labeled W) thereof. The selected zooming operation continues for the duration during which the zooming operation member 17a is pressed. The zooming operation members 3a and 17a input the start and end commands of the zooming operation, and the zooming direction as to whether the zooming operation is performed to the telephoto end or the wide-angle end.

Either of the zooming operation member 3a shown in FIG. 3A or the zooming operation member 17a shown in FIG. 3B, if incorporated in the image pickup apparatus, suffices here to carry out the zooming operation. Alternatively, the two zooming operation members may be mounted together on the apparatus to improve the ease of use of the apparatus. When the two zooming operation members are operated at the same time in this case, the digital processor 11 controls one of the two with priority.

The image pickup device 8 is specifically discussed below.

Figure 4A:
FIG. 4A illustrates a single reading unit of which address is specified in an image pickup device of a single color panel in accordance with the embodiment of the present invention.
Figure 4B:
FIG. 4B illustrates a single reading unit of which address is specified in an image pickup device of a monochrome panel in accordance with the embodiment of the present invention.

FIG. 4A illustrates a single reading unit of which address is specified in the image pickup device of a single color panel in accordance with the embodiment of the present invention. FIG. 4B illustrates a single reading unit of which address is specified in an image pickup device of a monochrome panel in accordance with the embodiment of the present invention.

The image pickup device 8 is an X-Y address type image pickup device, which is composed of two-dimensionally arranged pixels, and can read out a pixel at any position in the two-dimensionally arranged pixels by a combination of an X address and a Y address.

The image pickup device 8 is provided with a color filter when the image pickup device 8 is of a single color panel type. Used is a color filter of a Bayer pattern which includes, 2×2 segments as a unit of the RGB three primary colors with two G segments arranged in a diagonal line and one R segment and one B segment arranged in a diagonal line as shown in FIG. 4A. The RGB primary colors are the basics for color analysis. In the discussion that follows, the 2×2 color segments are treated as a single pixel.

When the image pickup device 8 is monochrome, one single pixel is treated as a unit as shown in FIG. 4B.

FIGS. 5A to 5C illustrate an electronic zoom in an image pickup device that is a 8 by 8 pixel arrangement model in the telephoto position thereof. FIG. 5A illustrates the arrangement of the image pickup device. FIG. 5B illustrates pixel data read from the image pickup device. FIG. 5C illustrates an output image to be displayed or to be recorded.

The image pickup device 8, under the control of the digital processor 11, is driven by the image pickup device driver 9. When data is read from pixels of the image pickup device 8, the electronic zooming is performed by varying the range of address of a combination of a range designated as an X address and a range designated as a Y address, thus by varying a clipping angle of view to define a clipping range of the pickup angle of view.

The pixels of the above image pickup device 8 (namely, the units shown in FIGS. 4A and 4B) are numbered 1 through 64 for identification as illustrated in FIG. 5A. The pickup angle of view RO is defined by an area formed by all effective pixels represented by numbers 1 through 64.

By reading several pixels in a block contained in the pickup angle of view RO of the image pickup device 8, the electronic zooming to the telephoto end is performed.

Referring to the arrangement in FIG. 5A, data A, B, C, and D respectively in four pixels of numbers 28, 29, 36, and 37 are read in that order, thereby becoming a pixel output to be displayed or recorded as shown in FIG. 5C. In this way, an image within the clipping angle of view RE boxed in a solid line in FIG. 5A is obtained. The electronic zooming toward the telephoto end is thus accomplished.

The number of pixels of the final image signal output to be displayed or recorded as a moving picture on a unit such as the display 13, the recorder 14, the wired interface 15, or the wireless interface 16 is four containing 2×2 pixels in the above model.

Figures 6A, 6B, 6C:
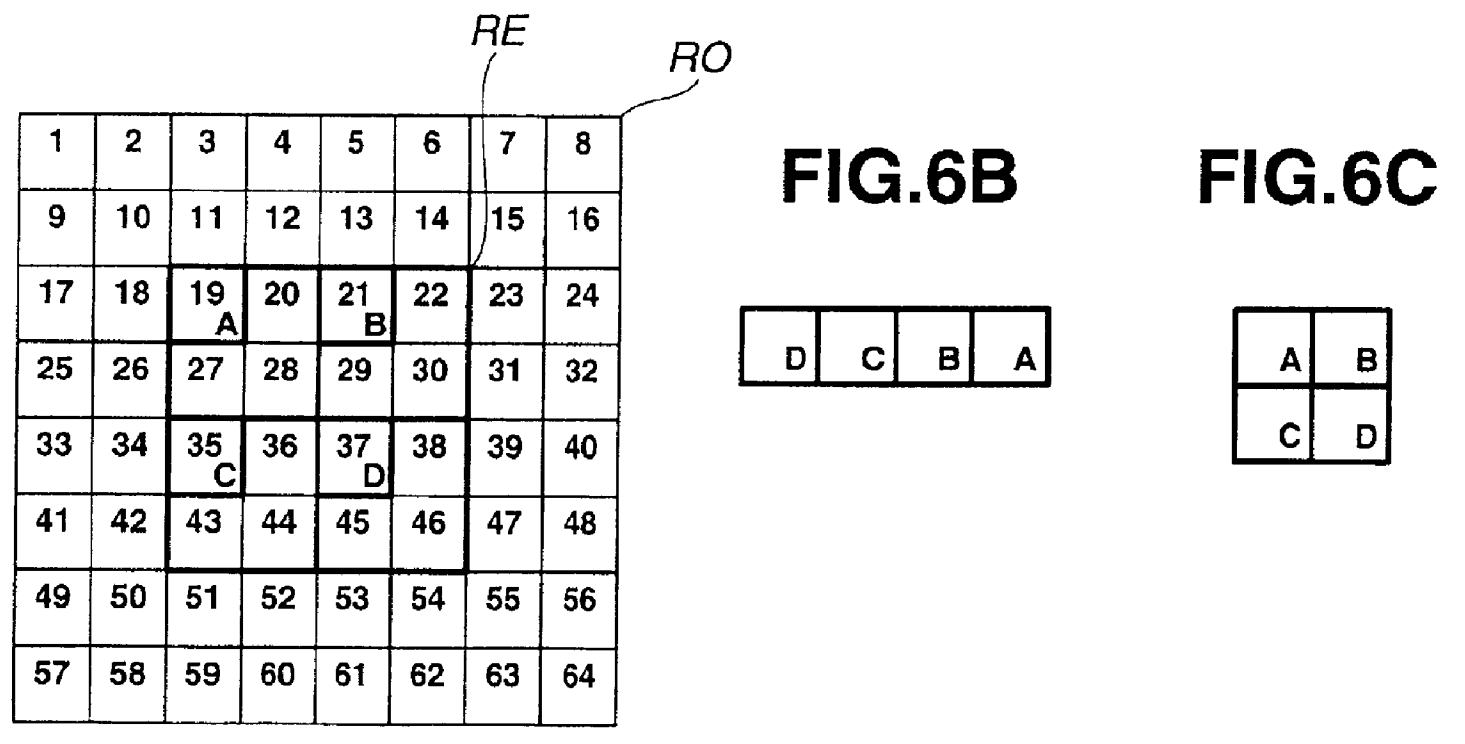

FIGS. 6A to 6C illustrate an electronic zoom in an image pickup device that is a 8 by 8 pixel arrangement model in the intermediate position thereof. FIG. 6A illustrates the arrangement of the image pickup device. FIG. 6B illustrates pixel data read from the image pickup device. FIG. 6C illustrates an output image to be displayed or to be recorded.

When one of the zooming operation member 3a and the zooming operation member 17a is operated from the telephoto position shown in FIGS. 5A and 5C toward the wide-angle end, the image pickup apparatus takes the angle of view as shown in FIGS. 6A to 6C.

Referring to FIG. 6A, the clipping angle of view RE (the area containing 4×4 pixels having numbers 19-22, 27-30, 35-38, and 43-46) wider than that shown in FIG. 5A in the pickup angle of view RO is divided into four areas of 2×2 pixels (one area formed of 2×2 pixels), because the output image is constructed of 2×2 pixels. Alternatively, a single area may be formed of m×n pixels (m and n are natural numbers), such as 2×3 pixels, or 2×4 pixels. The same is true of the following examples.

Pixel (A) having number 19 representing the first area containing the pixels numbered 19, 20, 27, and 28 is read, pixel (B) having number 21 representing the second area containing the pixels numbered 21, 22, 29, and 30 is read, pixel (C) having number 35 representing the third area containing the pixels numbered 35, 36, 43, and 44 is read, and pixel (D) having number 37 representing the fourth area containing the pixels numbered 37, 38, 45, and 46 is read (see FIG. 6B), and the output image of 2×2 pixels (see FIG. 6C) results.

The clipping angle of view RE is modified to the 4×4 pixels as the above. In addition, an intermediate zoom state is achieved with the electronic zoom by skip-reading out pixels at a skip-read-out rate at which a single pixel is read per 2×2 pixels to match the output pixels of 2×2 pixels. The skip-read-out rate is not limited to a single pixel per n×n pixels (n is a natural number). Generally, a single pixel per m×n pixels (m and n are natural numbers) may be read.

When each pixel is rectangular rather than square, or when the aspect ratio of the image needs to be modified, such reading of a skip-read-out rate is applied. The same is true of the following examples.

Figures 7A, 7B, 7C:
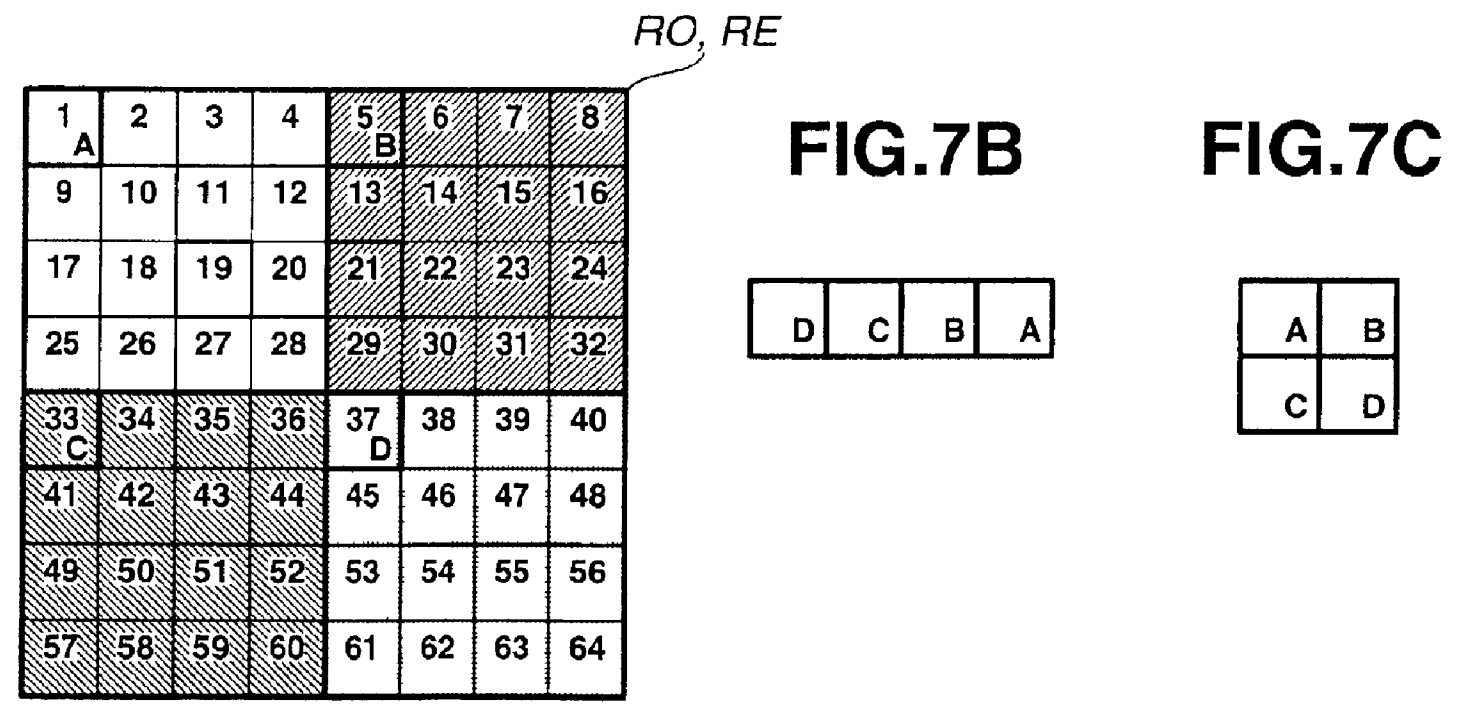

FIGS. 7A to 7C illustrate an electronic zoom in the image pickup device that is a 8 by 8 pixel arrangement model in the wide-angle position thereof. FIG. 7A illustrates the arrangement of the image pickup device. FIG. 7B illustrates pixel data read from the image pickup device. FIG. 7C illustrates an output image to be displayed or to be recorded.

When one of the zooming operation member 3a and the zooming operation member 17a is further operated from the wide-angle position shown in FIGS. 6A and 6C toward the wide-angle end, the image pickup apparatus takes the angle of view as shown in FIGS. 7A to 7C.

Referring to FIG. 7A, the entire pickup angle of view RO is the clipping angle of view RE. The clipping angle of view RE is divided into four areas because the output image is constructed of 2×2 pixels (in this model, the single area is formed of 4×4 pixels).

Pixel (A) having number 1 representing the first area containing the pixels numbered 1-4, 9-12, 17-20, and 25-28 is read, pixel (B) having number 5 representing the second area containing the pixels numbered 5-8, 13-16, 21-24, and 29-32 is read, pixel (C) having number 33 representing the third area containing the pixels numbered 33-36, 41-44, 49-52, and 57-60 is read, and pixel (D) having number 37 representing the fourth area containing the pixels numbered 37-40, 45-48, 53-56, and 61-64 is read (see FIG. 7B), and the output image of 2×2 pixels (see FIG. 7C) results.

The clipping angle of view RE is equalized to the pickup angle of view RO as the above. In addition, a wide-angle zoom state is achieved with the electronic zoom by skip-reading out pixels at a skip-read-out rate at which a single pixel is read per 4×4 pixels to match the output pixels of 2×2 pixels. The electronic zoom means sets, to be larger, the skip-read-out rate at which a single pixel is read per m×n pixels in the image pickup device (m and n are natural numbers) as the X-Y address range expands. The electronic zooming is thus performed by reading the pixel information from the image pickup device at the set skip read-out rate.

A single pixel is read from each divided area corresponding to the output number of pixels in the clipping angle of view RE in the X-Y address type image pickup device. This arrangement results in a reduction in power consumption in comparison with the CCD type image pickup apparatus in which all pixels need to be read.

Regardless of the magnitude of the clipping angle of view RE, the number of pixels to be read remains the same. Therefore, even if the clipping angle of view RE is increased, there is no need for increasing the reading rate of pixels. Since the reading rate remains constant, exposure suffers no change.

When a CCD type image pickup device is employed, the data of all pixels is temporarily stored in a frame memory and data of desired pixels only is then read from the frame memory. The frame memory is thus additionally required. The X-Y address type image pickup device allows data to be directly read from desired pixels in the image pickup device. The use of the X-Y address type image pickup device thus eliminates the need for the frame memory, thereby reducing the cost of the image pickup apparatus.

Figure 8:
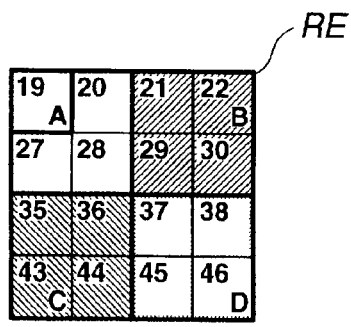
FIG. 8 illustrates a modification of the electronic zoom in an image pickup device that is an 8 by 8 pixel arrangement model in the intermediate position thereof in the above embodiment.

FIG. 8 illustrates a modification of the electronic zoom in an image pickup device that is a 8 by 8 pixel arrangement model in the intermediate position thereof.

The pixel located at the top left corner of each area is selected in each of the above arrangement when the four areas with each area formed of 2×2 pixels corresponding to the output image of 2×2 pixels are read. However, referring to FIG. 8, pixels located farthest away from the center of the clipping angle of view are read as representative pixels.

Specifically, pixel (A) having number 19 representing the first area containing the pixels numbered 19, 20, 27, and 28 is read, pixel (B) having number 22 representing the second area containing the pixels numbered 21, 22, 29, and 30 is read, pixel (C) having number 43 representing the third area containing the pixels numbered 35, 36, 43, and 44 is read, and pixel (D) having number 46 representing the fourth area containing the pixels numbered 37, 38, 45, and 46 is read. The output image of 2×2 pixels thus results.

Even when the pixels are read with the electronic zooming performed at a varied skip-read-out rate, the center of the output image remains aligned with the center of the clipping angle of view RE.

Figures 9A, 9B, 9C:
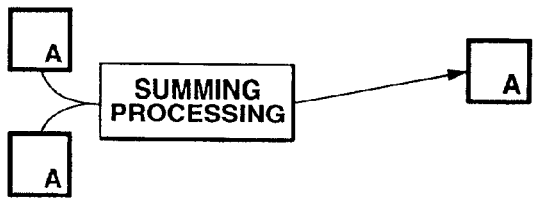

FIGS. 9A to 9C illustrate a modification of the electronic zoom in an image pickup device that is a 8 by 8 pixel arrangement model in the wide-angle position thereof. FIG. 9A illustrates the arrangement model of a first area in the image pickup device. FIG. 9B illustrates two pieces pixel data, which are read from the image pickup device and summed. FIG. 9C illustrates pixel data read from the first area.

Referring to FIGS. 9A to 9C, representative pixels are read out of four areas, each area formed of 4×4 pixels matching each pixel in FIG. 9C. In this case, a plurality of pixels are read and summed to obtain a single pixel representing one area rather than reading a single pixel only.

Specifically, pixels numbered 1 and 19 are read from the first area formed of pixels numbered 1-4, 9-12, 17-20, and 25-28 as shown in FIG. 9A and are subjected to a summing process, and the sum pixel (A) becomes a finally read pixel as shown in FIG. 9C.

Two pixels are read and summed equally in each of the remaining second through fourth area, thereby resulting finally read pixels.

The pixels subjected to the summing process are preferably selected from among regularly dispersed pixels within each area. For example, when two pixels are selected, the pixels numbered 1 and 19 are selected as shown in FIG. 9A.

The number of pixels to be summed are not limited to two. The number of pixels to be summed may be three or higher number.

Through the read and summing process, the pixel output more appropriately representing each area is obtained, thereby further improving image quality.

In the above-discussed model, the image pickup device has an aspect ratio of 1:1 having 8×8 pixels. The aspect ratio is not limited to 1:1. The present invention is equally applicable to an image pickup device having any of aspect ratios of image height:width=2:3, image height:width=3:4 and image height:width=9:16.

Specifically, when the output image covered by 480 rows by 640 columns of pixels is displayed or recorded as a moving picture, the electronic zooming will be performed if an image pickup device having a number of pixels sufficiently larger than that number, for example, having 960 rows by 1280 columns of pixels, is used.

The high-speed and high-resolution zooming operation of the image pickup apparatus will now be discussed with reference to FIGS. 10 through 13.

Figure 10:
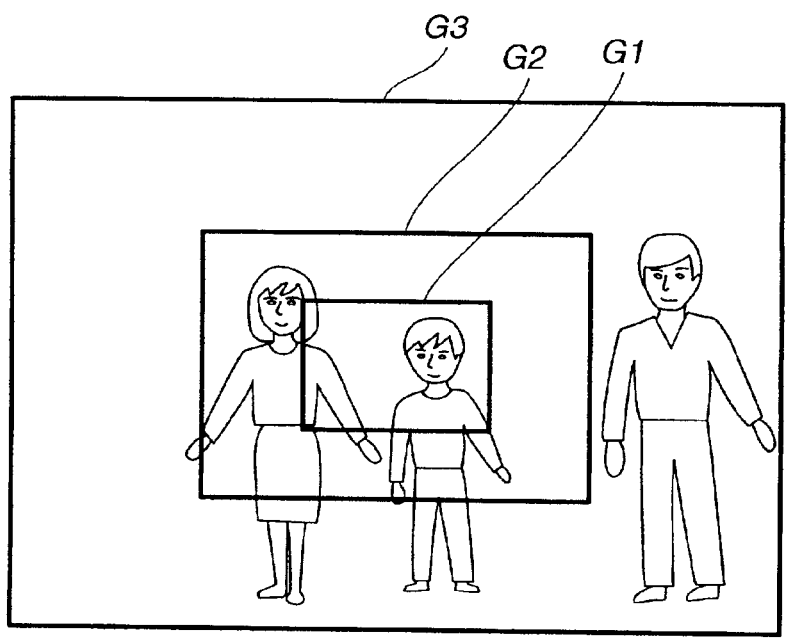
FIG. 10 illustrates the field of a subject image that is captured when the angle of view is modified in the embodiment.

FIG. 10 illustrates the field of a subject image that is photographed when the angle of view is modified.

A first angle of view G1 represents a small area in the center of the coverage, a second angle of view G2 is twice as large as the first angle of view G1, and a third angle of view G3 is twice as large as the second angle of view G2.

Figures 11, 12, 13:
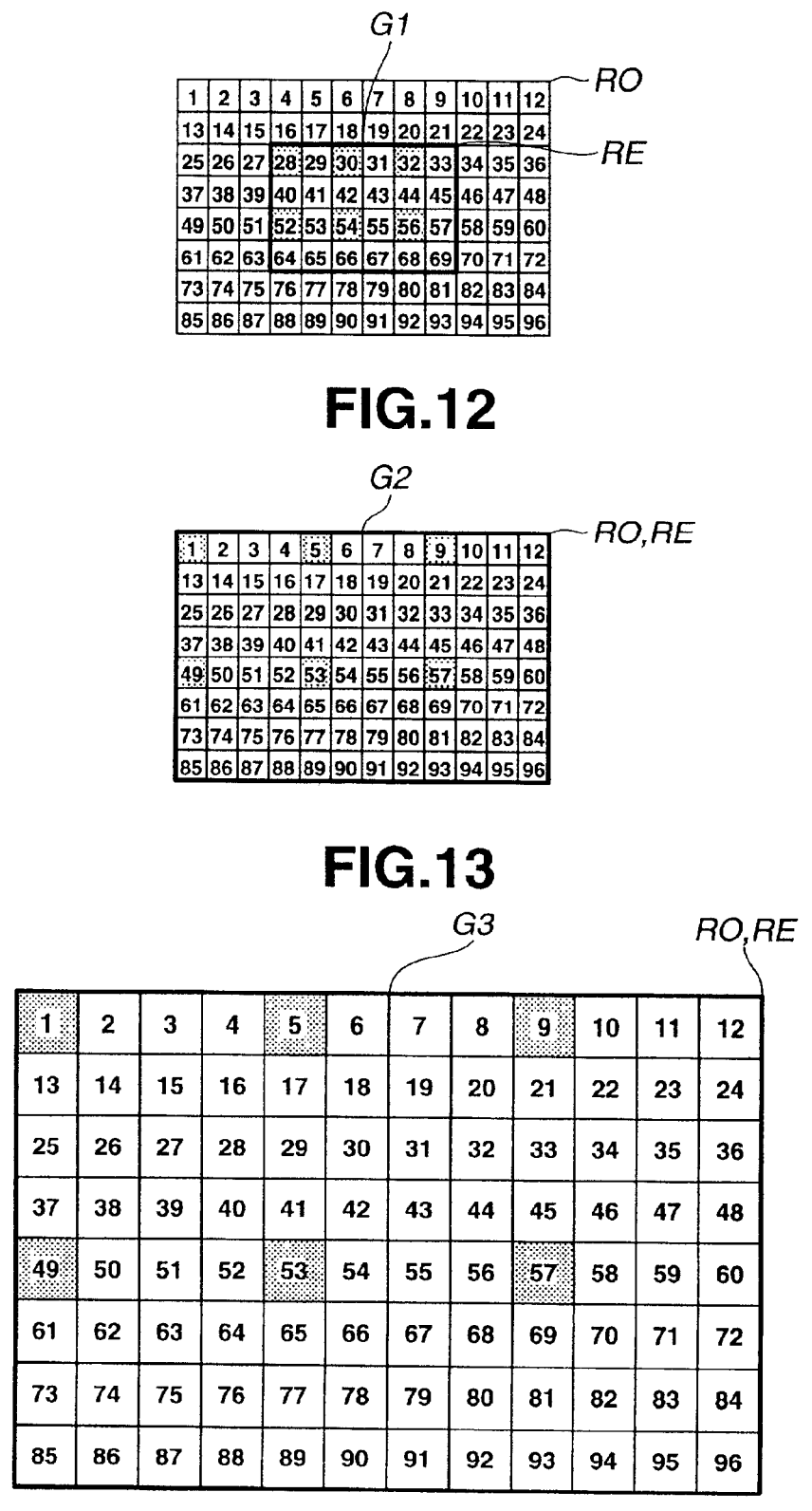

The zooming operation is performed from the first angle of view G1 to the second angle of view G2, and then from the second angle of view G2 to the third angle of view G3, as illustrated in FIGS. 11 through 13.

For simplicity of explanation, an output image of 2 rows by 3 columns of pixels is obtained from an image pickup device formed of a total of 96 pixels of 8 rows by 12 columns of pixels numbered 1 through 96. Specifically, however, an output image of 480 rows by 640 columns of pixels is obtained from an image pickup device formed of 960 rows by 1280 columns of pixels with an aspect ratio of 2:3, and a zooming magnification of 2 is thus accomplished in the electronic zoom.

FIG. 11 illustrates the electronic zoom that selects the first angle of view G1 as an output angle of view of a finally output picture signal when the pickup angle of view is the second angle of view G2.

The pickup angle of view RO of the image pickup device 8 is the second angle of view G2. Six pixels numbered 28, 30, 32, 52, 54, and 56 are read from the image pickup device 8 in which a clipping angle of view RE delineated by pixels numbered 28-33, 40-45, 52-57, and 64-69 becomes the first angle of view G1. In this way, the output image of 2 rows by 3 columns of pixels corresponding to the first angle of view G1 is obtained.

FIG. 12 illustrates the electronic zoom that selects the second angle of view G2 as an output angle of view of a finally output picture signal when the pickup angle of view is the second angle of view.

When the zooming operation is performed toward the wide-angle end from the first angle of view G1 to the second angle of view G2 as shown in FIG. 11, the pixels to be read from the image pickup device are modified with the optical zoom fixed as shown in FIG. 12.

Since the second angle of view G2 is the pickup angle of view, an image of 2 rows by 3 columns of pixels corresponding to the second angle of view G2 is output by reading pixels numbered 1, 5, 9, 49, 53, and 57 from among the total of 96 pixels.

A random-access X-Y address type image pickup device which is sufficiently higher in definition than the output image is used. The pixels to be read from the image pickup device are changed with the high resolution maintained. The electronic zoom is thus performed toward the wide-angle end to the second angle of view G2 which is twice as large as the first angle of view G1.

FIG. 13 illustrates the electronic zoom that selects the third angle of view G3 as an output angle of view of a finally output picture signal when the pickup angle of view is the third angle of view G3.

The optical zoom is here used because the zooming operation cannot be performed to the wide-angle end beyond the second angle of view G2 with the electronic zoom alone as shown in FIG. 12.

Specifically, as in FIG. 12, the pixels to be read from the image pickup device 8 are six pixels numbered 1, 5, 9, 49, 53, and 57. In other words, the zoom setting of the electronic zoom remains unchanged from the state shown in FIG. 12. On the other hand, the optical zoom is set to the wide-angle side so that the pickup angle of view RO becomes the third angle of view G3.

The pixels numbered 1, 5, 9, 49, 53, and 57 are read when the pickup angle becomes the third angle of view. This reading enables the output of an image with an aspect ratio that corresponds to the third angle of view G3.

The combination of the electronic zoom and the optical zoom thus accomplishes a wide range of zooming.

Discussed next is the flow of control of the zooming operation using the zooming operation member 3a shown in FIG. 3A and the zooming operation member 17a shown in FIG. 3B.

It is now assumed that the zoom is set to the telephoto side as shown in FIG. 11.

In this zoom setting, one of the zooming operation member 3a and the zooming operation member 17a is operated for zooming toward the wide-angle end. The electronic zoom is performed with the optical zoom fixed. The zoom is then set to the second angle of view G2 as shown in FIG. 12.

When the image pickup device is further zoomed out toward the wide-angle end, the optical zooming is performed to the third angle of view G3 with the electronic zoom fixed as shown in FIG. 13.

Since the electronic zoom is first operated, the angle of view is quickly changed for the initial phase of zooming.

As described above, pixels required to output the image are directly read from the image pickup device when the image pickup device is zoomed out from the first angle of view G1 to the second angle of view G2 and when the image pickup device is zoomed out from the second angle of view G2 to the third angle of view G3. Since no interpolation processing is performed using the frame memory, a zooming operation with an overall zoom magnification of 4 is carried out with a high resolution maintained, which would not achieved by the electronic zoom alone or the optical zoom alone.

The combination of the optical zoom with the electronic zoom involving no mechanical operation achieves a high-speed zooming operation at a low power consumption, compared with the case in which the optical zoom only is used for a zoom magnification of 4. Since the optical zoom having a zoom magnification of 2 works in this case, the resulting image pickup apparatus is not costly.

In the arrangement illustrated in FIGS. 10 through 13, the electronic zoom has a zoom magnification of 2 and the optical zoom has a zoom magnification of 2. Alternatively, a high zoom magnification is possible. For example, each of the electronic zoom and the optical zoom has a zoom magnification of 4, resulting in an overall zoom magnification of 16.

Another arrangement is also possible in which the electronic zoom operates with a zoom magnification of up to 2 and the optical zoom operates with a zoom magnification of 2 to 4, and then the electronic zoom operates with a zoom magnification of 4 to 8 and the optical zoom operates with a zoom magnification of 8 to 16.

When the image pickup device 8 is a single-panel color image pickup device, four pixels illustrated in FIG. 4A are regarded as a unit pixel.

As already discussed, the electronic zoom is advantageously performed at a high speed. Taking advantage of this feature, the angle range of view is set or controlled in the electronic zoom and the optical zoom. The setting of the angle of view is now discussed with reference to FIGS. 14 and 15.

Figure 14:
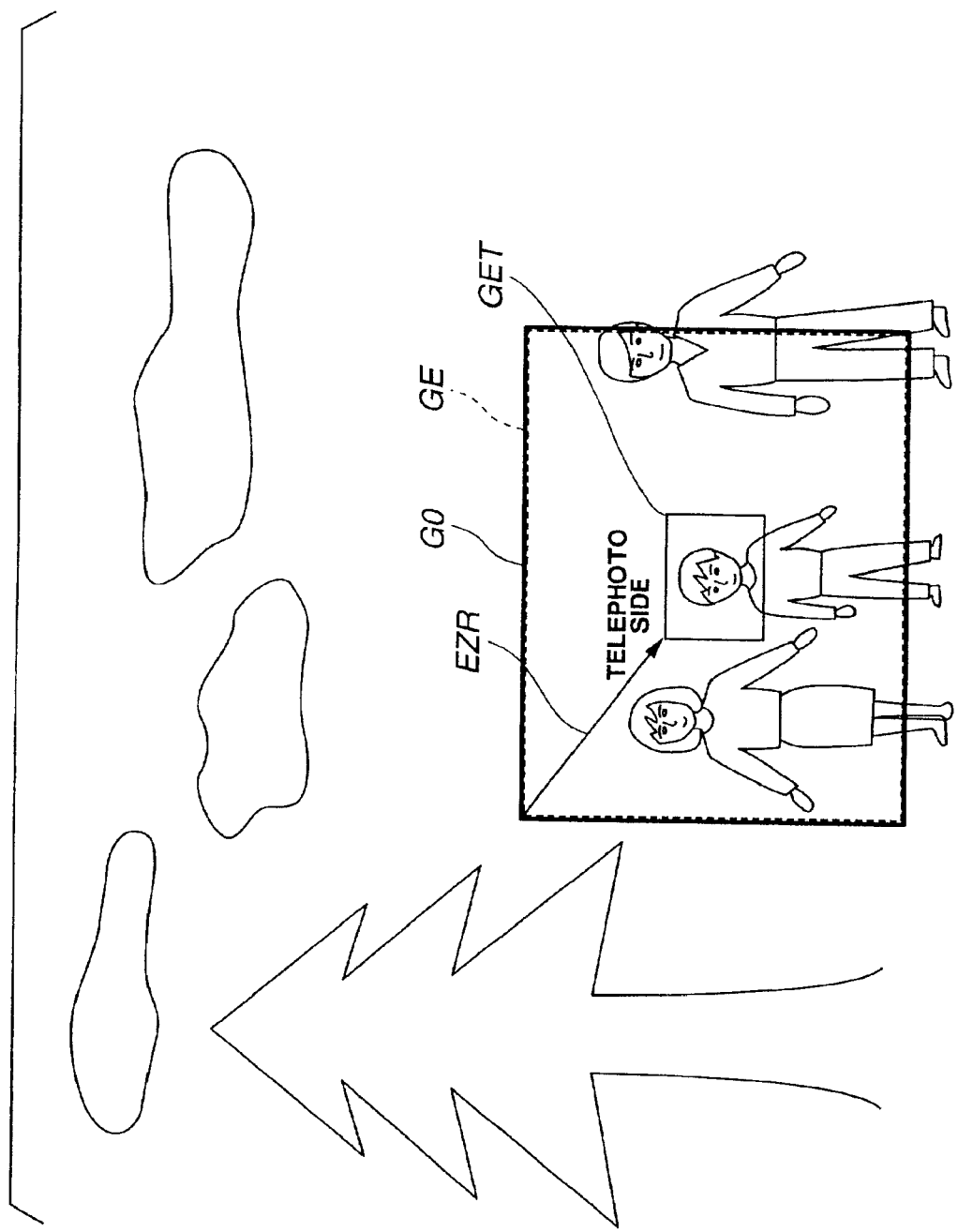
FIG. 14 illustrates the setting in which the electronic zooming is possible in a wide range of area on the telephoto side in the above embodiment.

FIG. 14 illustrates the setting in which the angle of view in each of the electronic zoom and the optical zoom is set so that the electronic zoom is possible within a wide range on the telephoto side.

When the image pickup device is instructed to zoom in toward the telephoto end with one of the zooming operation member 3a and the zooming operation member 17a operated, the electronic zoom zooms in for modifying the angle of view toward the telephoto end with the optical zoom fixed.

When the one of the zooming operation member 3a and the zooming operation member 17a is then stopped, there is a probability that the zoom variable range of the electronic zoom at the telephoto side is narrowed or the electronic zoom is set to the telephoto end.

The image pickup device is zoomed out toward the wide-angle end using the electronic zoom while being zoomed in toward the telephoto end using the optical zoom so that the same output clipping angle of view is maintained. The combination of the angle range of view by the electronic zoom and the angle range of view by the optical zoom is modified so that the clipping angle of view (designated by GE in FIG. 14) is equalized to the pickup angle of view (designated by GO in FIG. 14). In other words, with the same output angle of view maintained, the image pickup device is zoomed out toward the wide-angle end using the electronic zoom while being zoomed in toward the telephoto end using the optical zoom. As a result, the electronic zoom zooms in in a wide range in the telephoto direction (to the telephoto end GET as represented by an arrow EZR).

Referring to FIG. 14, the electronic zoom works in a wide range on the telephoto side. Alternatively, the electronic zoom may be set to work in a wide range on the wide-angle side.

With the setting illustrated in FIG. 14, a rapid zooming operation of the electronic zoom is performed toward the telephoto end in a wide zoom range when one of the zooming operation member 3a and the zooming operation member 17a is operated again.

Figure 15:
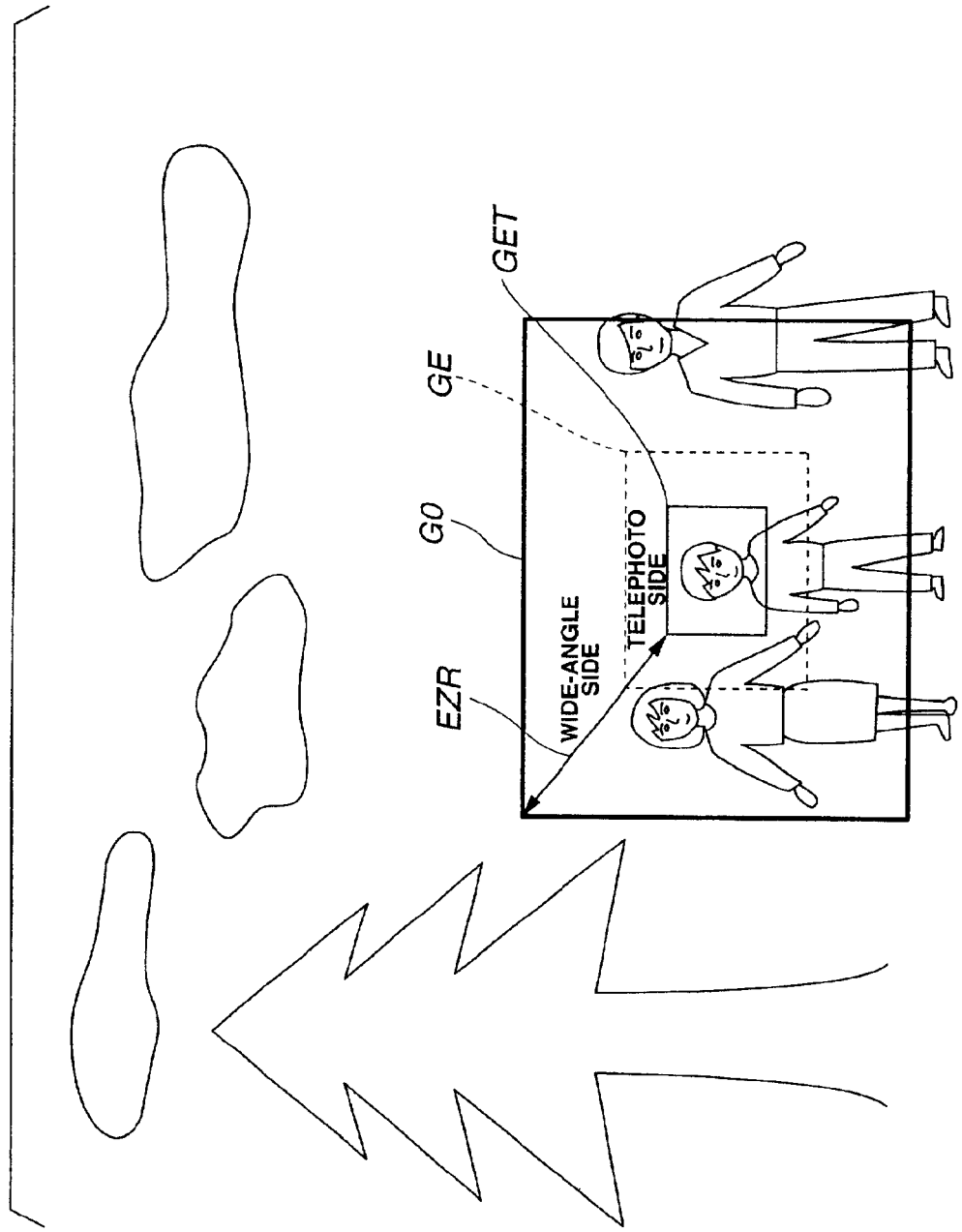
FIG. 15 illustrates the setting in which the electronic zoom is possible both toward the wide-angle side and the telephoto side in the above embodiment.

FIG. 15 illustrates the setting in which the electronic zoom is possible both on the wide-angle side and the telephoto side.

It is now assumed that the image pickup apparatus photographs the subject shown in FIG. 10 in the zoom setting illustrated in FIG. 11.

When a zoom command to the wide-angle side is input with one of the zooming operation member 3a and the zooming operation member 17a operated, the electronic zoom zooms out toward the wide-angle side with the optical zoom fixed. The image pickup device is shifted to the second angle of view G2 illustrated in FIG. 12.

Since the clipping angle of view agrees with the pickup angle of view when the operation of the one of the zooming operation member 3a and the zooming operation member 17a ends, the electronic zoom cannot zoom out toward the wide-angle side any longer.

The electronic zoom zooms in toward the telephoto end while the optical zoom zooms out toward the wide-angle end. With the output clipping angle of view maintained, the combination of the clipping angle range of the electronic zoom and the clipping range of the optical zoom is modified so that the zoom setting of the electronic zoom is in a mid-way point between the wide-angle end and the telephoto end of the electronic zoom. Specifically, with the same output angle of view maintained, the electronic zoom zooms in toward the telephoto end while the optical zoom zooms out toward the wide-angle end. The clipping angle of view of the electronic zoom is set so as to position between the wide-angle end and the telephoto end of the electronic zoom.

In this setting, the electronic zoom can zoom out from the current clipping angle of view (represented by GE in FIG. 15) to the pickup angle of view (represented by GO in FIG. 15) in the wide-angle direction, or can zoom in to the telephoto end GET in the telephoto direction. The electronic zoom thus works in a range represented by an arrow-headed line segment EZR. The clipping angle of view set in this case is between the telephoto end and the wide-angle end of the electronic zoom.

When the zoom direction input by the control means can be performed by any of the electronic zoom or the optical zoom as described above, the electronic zoom is activated with a priority. When the electronic zoom reaches one of the telephoto end or the wide-angle end within the zoom range thereof, the optical zoom overrides the electronic zoom.

The zooming operation starts in response to a command input from the operation means. When the stop command of the zooming operation is input, the electronic zoom is activated with the output angle of view at the end of the zooming operation set to be a predetermined angle of view within the electronic zoom range. While the electronic zooming is in progress, the optical zooming is performed so that the output angle of view at the end is maintained.

When one of the zooming operation member 3a and the zooming operation member 17a is operated again, both the rapid electronic zooming toward the wide-angle end and the rapid electronic zooming toward the telephoto end are possible.

Figure 16A:
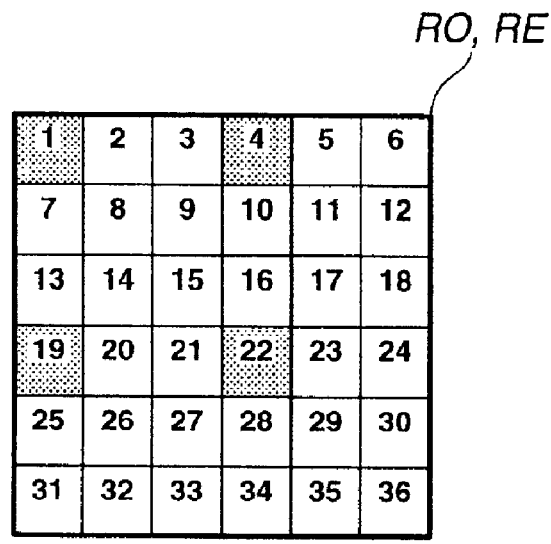
FIGS. 16A and 16B are diagrams illustrating the electronic zoom which zooms in from the wide-angle end toward the telephoto end in the above embodiment.
Figure 16A:
Figure 16B:
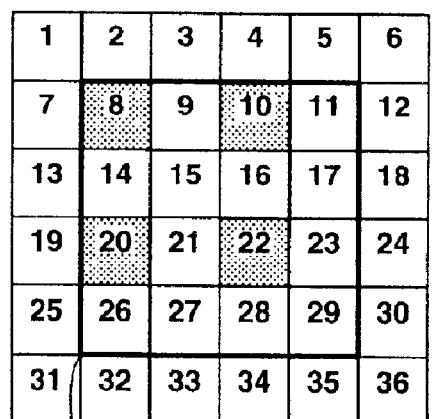
Figure 17A:
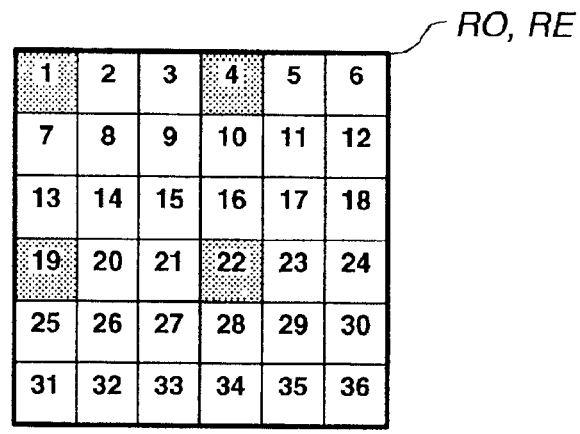
FIGS. 17A to 17C illustrate a zooming operation toward the telephoto end with the electronic zoom and the optical zoom combined in the above embodiment.
Figure 17B:
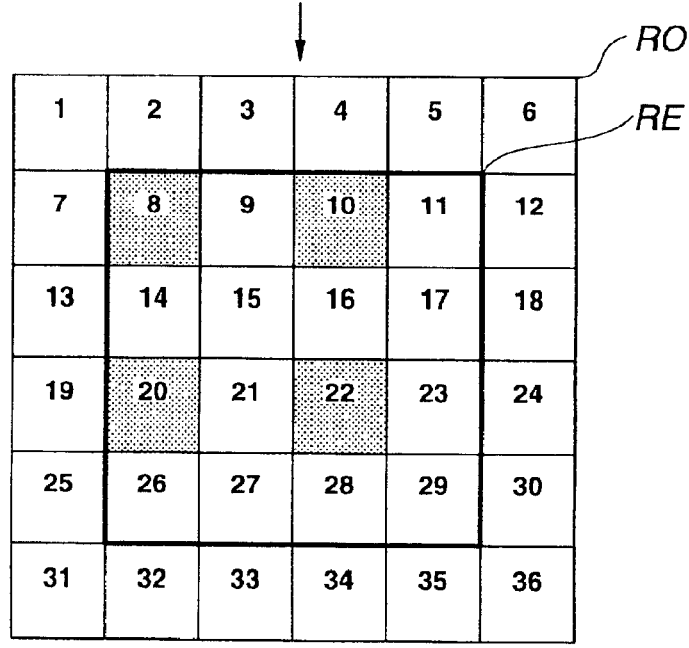
Figure 17C:
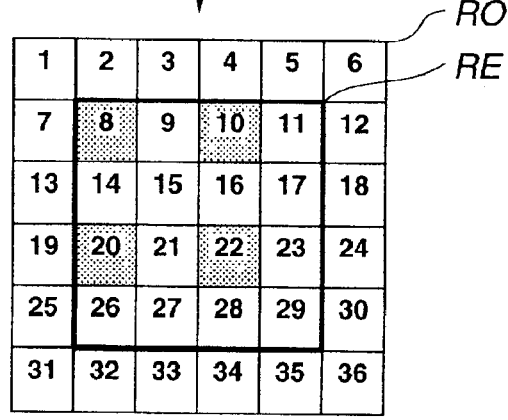

FIGS. 16A and 16B are diagrams illustrating the electronic zooming from the wide-angle end toward the telephoto end. FIGS. 17A to 17C illustrate a zooming operation toward the telephoto end with the electronic zoom and the optical zoom combined.

In the random-access X-Y address type image pickup device described above, any pixel may be read according to the pixel unit by designating a combination of an X address and a Y address. To perform electronic zooming, the angle of view may be changed in units of a minimum of one pixel.

In the zooming operation in the telephoto direction to expand a subject, the electronic zoom changes the clipping angle of view RE in units of one pixel from a first angle of view shown in FIG. 16A to a second angle of view shown in FIG. 16B.

To obtain an output image having an angle of view, intermediate between the first angle of view and the second angle of view, in units finer than one pixel, pixels in the first angle of view wider than the intermediate angle of view may be first read, and an interpolation processing may be performed between pixels. The interpolation processing in this case can degrade the resolution of the output image.

After picking up an image at the first angle of view as illustrated in FIG. 17A, the optical zoom is driven to the wide-angle side while the electronic zoom is driven to the telephoto side. The output angle of view which becomes the field of the subject in the picture signal finally output agrees with the first angle of view shown in FIG. 17A. The second angle of view shown in FIG. 17B thus results.

The optical zoom then zooms in toward the telephoto end, thereby resulting in a third angle of view as shown in FIG. 17C. Consequently, the same angle of view as that shown in FIG. 16B is obtained.

Specifically, the electronic zoom means modifies the skip-read-out rate at which a single pixel out of m×n pixels in the image pickup device is read (m and n are natural numbers), thereby changing the clipping angle of view, and thereby enabling at least discontinuous zooming. The electronic zoom means updates a skip-read-out rate at which a single pixel per m×n pixels of the image pickup device (m and n are natural numbers) is read, and switches over sequentially from the first clipping angle of view to the second clipping angle of view different from the first clipping angle of view, thereby performing discontinuous zooming. And the control means sets the clipping angle of view to one of the first clipping angle of view and the second clipping angle of view, while controlling the pickup angle of view, thereby performing continuous zooming with any output angle of view.

Since the optical zoom covers an intermediate angle of view between the first angle of view and the second angle of view of the electronic zoom, a high-resolution zooming continuous from the first angle of view to the second angle of view is carried out.

In the discussion with reference to FIG. 16A through FIG. 17C, the image pickup device has 6 rows by 6 columns of effective pixels with the output pixels of 2×2 for reading. In practice, the image pickup device typically incorporates 100 millions or more of pixels. The above discussion also applies to such an image pickup device.

In the above-reference technique, the optical zoom, which covers an angular range between discrete angles of view of the electronic zoom which uses no interpolation processing, continuously varies the angle of view. This technique is not limited to the case in which the electronic zooming is carried out in units of one pixel. The technique also applies to the case in which the electronic zooming is carried out in units of two or more pixels.

When the electronic zoom carries out a large discrete change, for example, as large as a zoom magnification of 2 as already discussed with reference to FIGS. 5A through 7C, the optical zoom works for an intermediate angle of view falling within a range of greater than a magnification 1 but smaller than a magnification of 2, i.e., 1 <range<2.

As discussed above, the electronic zoom and the optical zoom are controlled in combination. The final zoom range of the output angle of view of the finally output picture signal is substantially wider than any of the optical zoom range performed in response to a change in the pickup angle of view and the electronic zoom range performed in response to a change in the clipping angle of view. A wide range of zooming is thus performed with a high resolution.

When the optical zooming is performed, the optical axis may be deviated from the center of the image pickup device 8 in the zooming operation. Such a deviation of the optical axis may be typically observed in digital cameras having lenses integrated thereinto, or lens-switching type microscopes.

Referring to FIGS. 18A and 18B, the clipping angle of view RE may be shifted to cancel the deviation of the optical axis, thereby aligning the center of the clipping angle of view RE with the position REO of the optical axis on the image pickup device 8. The deviation of the optical axis is thus corrected.

FIGS. 18A to 18B illustrate that the clipping angle of view is shifted together with the shifting of the optical axis.

Referring to FIG. 18A, six pixels numbered 28, 30, 32, 52, 54, and 56 are read when the optical axis position REO is present at a first center, namely, at the overlapping corners of four pixels numbered 42, 43, 54, and 55. Referring to FIG. 18B, six pixels numbered 15, 17, 19, 39, 41, and 43 are read when the optical axis position REO is present at a second center, namely, at the overlapping corners of four pixels numbered 29, 30, 41, and 42. In this way, the picture output of the same angle of view of 2×3 pixels shifted to be aligned with the optical axis is obtained. The electronic zoom means moves the address range so that the center position of the clipping angle of view is aligned with the optical axis of the optical device that may suffer a deviation with the focal length thereof varied.

The deviation of the optical axis position REO is stored beforehand in a non-volatile memory built in the image pickup apparatus as correction data responsive to the zoom position of the optical zoom formed of the lens 1. The correction data is then read.

The method for obtaining the correction data is not limited to this method. For example, picture data from the image pickup device 8 is analyzed to detect the deviation of the optical axis position REO on a real-time basis.

By keeping the center of the clipping angle of view aligned with the optical axis, an image pickup apparatus with the optical axis suffering a deviation of the optical axis provides an excellent quality output picture free from blurring.

Figure 19:
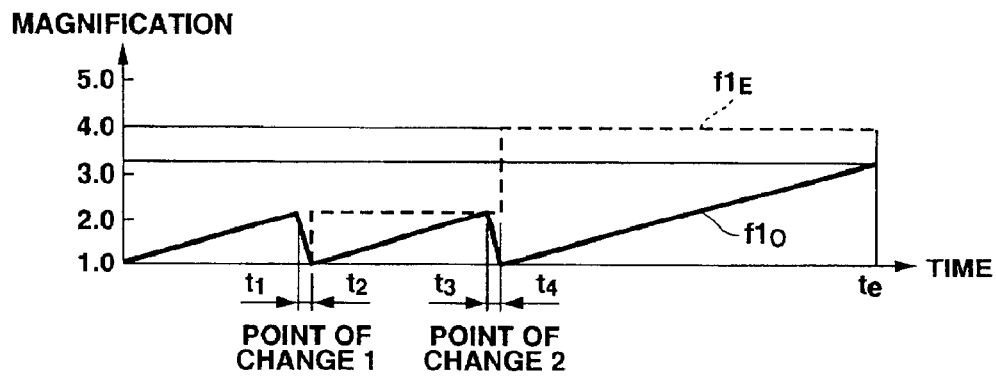
FIG. 19 plots a change in the zoom magnification of each of the electronic zoom and the optical zoom in the above embodiment.
Figure 20:
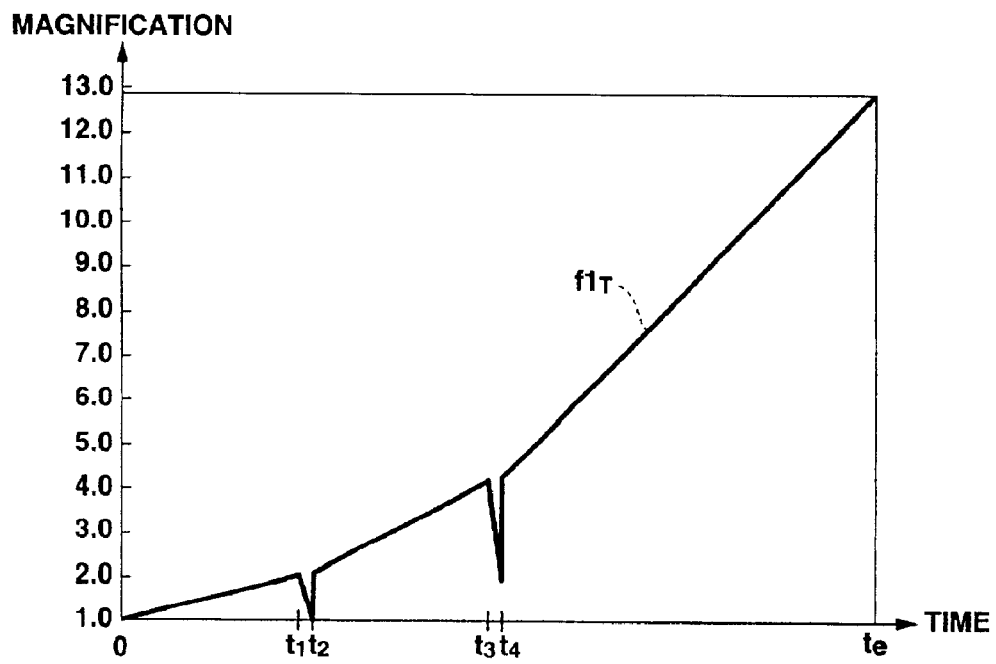
FIG. 20 plots a change in the overall zoom magnification with the electronic zoom and the optical zoom combined.

FIG. 19 plots a change in the zoom magnification of each of the electronic zoom and the optical zoom. FIG. 20 plots a change in the overall zoom magnification with the electronic zoom and the optical zoom combined.

Referring to FIG. 19, a line f1O represents a change in the zoom magnification of the optical zoom, and a line f1E represents a change in the zoom magnification of the electronic zoom. Referring to FIG. 20, a curve f1T represents a change in the overall zoom magnification accounting for the effect of the combination of the optical zoom and the electronic zoom.

As shown, the zoom magnification by the optical zoom only is about 3.2 times, and the zoom magnification by the electronic zoom only is 4 times.

When one of the zooming operation member 3a and the zooming operation member 17a is operated giving a command to zoom in toward the telephoto end with the overall zooming of the electronic zoom and the optical zoom at the wide-angle end, the optical zoom works following the curve f1O with the electronic zoom fixed to a zoom magnification of 1.

The optical zoom returns to the zoom magnification of 1 after reaching a zoom magnification of 2 at time t1. The electronic zoom is then shifted to a magnification of 2 as represented by the line f1E. At time t2, the electronic zoom, instead of the optical zoom, results in a zoom magnification of 2, once achieved at time t1 by the optical zoom. The optical zoom is thus switched to the electronic zoom at a point of change 1 between time t1 and time t2.

When a zooming operation toward the telephoto end continues at time t2, the optical zoom zooms in toward the telephoto end following the line f1O while keeping the electronic zoom at a magnification of 2 in accordance with the line f1E.

The optical zoom returns again to a magnification of 1 after reaching a zoom magnification of 2 at time t3. The electronic zoom is then shifted to a magnification of 4. A zoom magnification of 4, reached by a magnification of 2 by the electronic zoom and a magnification of 2 by the optical zoom at time t3, is achieved by the electronic zoom only at time t4. The apparatus switches between the electronic zoom and the optical zoom at a point of change 2 between time t3 and time t4. For a switching period within which the control means switches between the first clipping angle of view and the second clipping angle of view, the control means varies the pickup angle of view toward the direction in which a change in the output angle of view attributed to the switching of the clipping angle of view is cancelled. And the control means varies the pickup angle of view by a change which substantially cancels a change in the output angle of view attributed to the switching of the clipping angle of view by the electronic zoom means.

When the zooming operation toward the telephoto end is continuously performed, the optical zoom zooms in toward the telephoto end in accordance with the line f1O. The zooming operation stops at the moment the optical zoom reaches a zoom magnification of 3.2 on the telephoto side at time te. As represented by a line f1T in FIG. 20, an overall zoom magnification of 12.8 results from multiplying an optical zoom magnification of about 3.2 and an electronic zoom magnification of 4. As discussed, control is performed to have the electronic zoom and the optical zoom alternated sequentially.

In the above discussion, the zoom magnification of the electronic zoom is changed at the moment the optical zoom returns to a magnification of 1 at time t2 or time t4. The magnification of the electronic zoom may be changed at any moment between time t1 and time t2, and between time t3 and time t4.

One frame of the picture read at time t1 or time t3 immediately prior to the point of change is stored in storage means such as the memory 12 so that the zoom magnification of the picture displayed on the display 13 is not varied. During the time interval from time t1 to time t2, the one frame of picture stored at time t1 is repeatedly read and displayed in each frame period. During the time interval from time t3 to time t4, the one frame of picture stored at time t3 is repeatedly read and displayed in each frame period.

Even at the points of change for switching between the optical zoom and the electronic zoom, the picture free from any disturbance is thus observed.

Since each of the point of change 1 and the point of change 2 is set at a point where the optical zoom reaches a zoom magnification of 2, the point of change is reached by the same distance of travel of the lens 1. It is therefore easy to maintain the optical zoom magnification with a high accuracy at the points of change.

The point of change is set up here at the point where the optical zoom reaches a zoom magnification of 2. Alternatively, the zoom magnification may be 3 or any other appropriate number.

The control means sets, as a change of point in the clipping angle of view and a change of point in the pickup angle of view, the point where the amount of change in the pickup angle of view of the optical zoom means when the control means switches between the first clipping angle of view and the second clipping angle of view coincides with the amount of change in the pickup angle of view of the optical zoom means when the control means switches between a third clipping angle of view, different from any of the first and second clipping angle of view, and the second clipping angle of view.

The control means controls the storage means to store therewithin the pixel information that is read immediately prior to the switching period and then to repeatedly read picture information based on the pixel information stored in the storage means instead of reading the pixel information from the image pickup device.

Since the same picture stored is repeatedly read during the period from time t1 to time t2 and the period from time t3 to time t4, the picture is presented with the zooming operation suspended for these periods. Alternatively, an interpolation processing may be performed on the stored framed pictures to produce continued framed pictures with the angles of view smoothly changed. The pictures are thus displayed with the zooming operation continuously working even at the points of change. In other words, the pixel information based on the pixel information stored in the storage means is obtained by interpolating the pixel information stored in the storage means and it is the information with respect to a different angle of view. The different angle of view can continuously change the output angle of view in the zoom direction immediately prior to the period.

In the above-discussed zooming operation toward the telephoto end, the picture read immediately prior to the point of change is directly stored as a framed picture. To perform the zooming operation toward the wide-angle end, the storage means must store pixel information in a range containing the output angle of view subsequent to the point of change, of which angle is wider than the output angle of view immediately prior to the point of change. Such pixel information is read beforehand. In this way, pictures are presented without any lack of information in the zooming operation toward the wide-angle end.

When the zooming operation is in the telephoto direction, the electronic zoom means maintains the address range of the clipping angle of view immediately prior to the period. When the zooming operation is the wide-angle direction, the electronic zoom means sets up an address range of a wide clipping angle of view including the clipping angle of view immediately subsequent to the end of the period. The storage means stores the pixel information within the address range set by the electronic zoom means.

Figure 21:
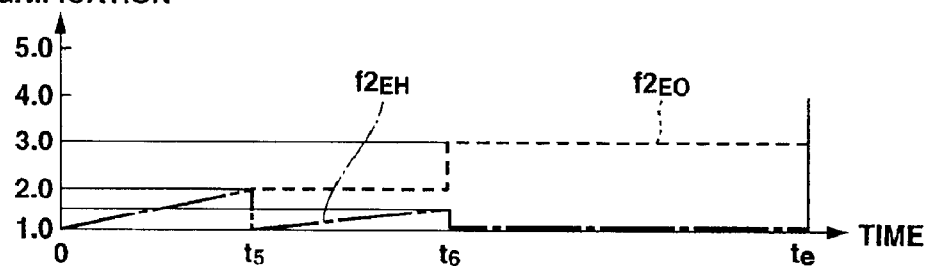
FIG. 21 plots changes in reading zoom magnification and interpolation zoom magnification in the electronic zoom that performs an interpolation processing in accordance with the embodiment of the present invention.
Figure 22:
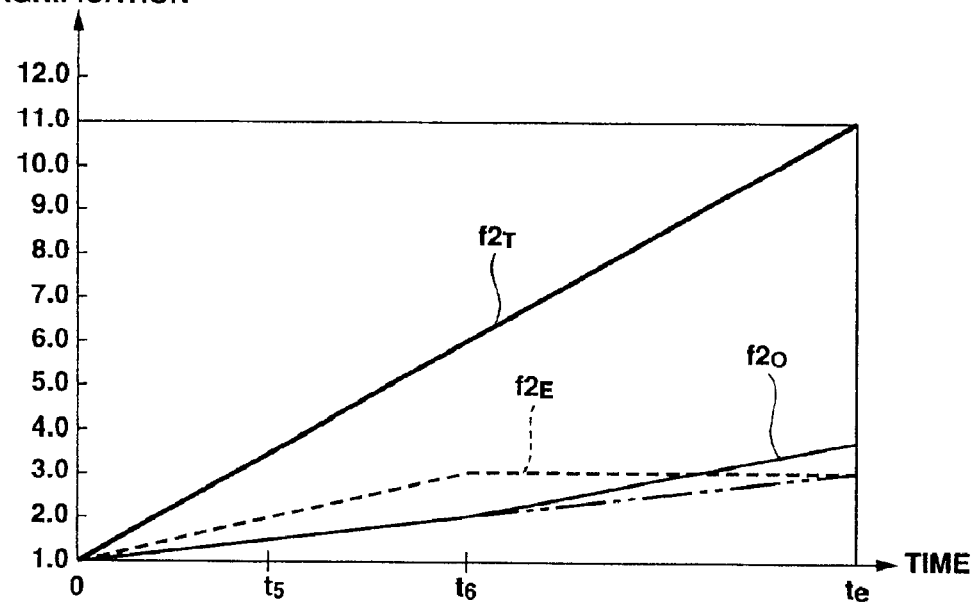
FIG. 22 plots a change in the overall zoom magnification with the optical zoom combined with the electronic zoom which performs an interpolation processing in accordance with the embodiment of the present invention.

FIG. 21 plots changes in reading zoom magnification and interpolated zoom magnification in the electronic zoom that performs an interpolation processing. FIG. 22 plots a change in the overall zoom magnification with the optical zoom combined with the electronic zoom which performs an interpolation processing.

Referring to FIG. 21, a line f2EO represents a change in the reading zoom magnification, and a line f2EH represents a change in the interpolated zoom magnification. Referring to FIG. 22, a line f2O represents a change in the zoom magnification of the optical zoom, a line f2E represents a change in the zoom magnification of the electronic zoom, and a line f2T represents a change in the overall zoom magnification of the optical zoom and the electronic zoom combined.

The electronic zoom means modifies the skip-read-out rate at which one pixel is read per m×n pixels from the image pickup device, thereby switching the clipping angle of view among the plurality of clipping angles of view. To set up a different target angle of view between the plurality of clipping angles of view, an interpolation processing is carried out in which the pixel information of target pixels within the target angle of view is calculated from pixel information in the vicinity of the target pixels, based on the pixel information of a clipping angle of view wider than the target angle of view. The electronic zoom and the optical zoom are concurrently operated. The rate of change in the pickup angle of view of the optical zoom is set to be different from when the interpolation processing is performed with the angle of view continuously varied to when no interpolation processing is performed. Regardless of whether or not the interpolation processing is performed, the output angle of view is varied at a constant rate.

The above operation is specifically discussed below.

It is assumed here that the zoom magnification of the optical zoom only is about 3.67 and that the zoom magnification of the electronic zoom only is 3.

When one of the zooming operation member 3a and the zooming operation member 17a is operated to zoom in toward the telephoto end with the zooming of the electronic zoom and the optical zoom in combination set at the wide-angle end, the zooming operation of the electronic zoom and the optical zoom combined is carried out.

With the electronic zoom performing the interpolation processing, the changes in the reading zoom magnification and the interpolation zoom magnification are made as shown in FIG. 21. Referring to FIG. 21, the interpolation zoom magnification only increases at a constant rate in accordance with the line f2EH with the reading zoom magnification fixed at a magnification of 1.

When the interpolation zoom magnification reaches 2 at time t5, the reading zoom magnification is shifted to 2 as represented by the line f2EO while the interpolation zoom magnification is returned to 1 as represented by the line f2EH.

The interpolation zoom is thereafter performed with the reading zoom magnification fixed to 2. The reading zoom magnification is switched to 3 after the interpolation zoom magnification reaches 1.5 at time t6, and the interpolation zoom magnification is then switched back to 1.

Since the electronic zoom has a maximum zoom magnification of 3 here, the zooming operation is thereafter carried by the optical zoom only.

The line f2E represents the change in the zoom magnification of the electronic zoom performing the interpolation processing as shown in FIG. 22. When the zooming operation starts, the zoom magnification increases at a constant rate, and then reaches 3 at time t6, and thereafter flattens off at that level.

At the beginning of the zooming operation, the optical zoom increases the zoom magnification thereof at a constant rate until time t6. The optical zoom reaches a zoom magnification of 2 at time t6, thereby driving an overall zoom magnification to 6 as represented by the line f2T.

From time t6 thereafter, the electronic zoom is fixed onto a zoom magnification of 3 as already described. To keep the change in the overall zoom magnification to the same level prior to time t6, the zoom magnification of the optical zoom is increased to compensate for no increase in the electronic zoom magnification.

As plotted by the line 2fT, the overall zoom magnification increases at a constant rate from 1 to 11.

The optical zoom in combination with the electronic zoom that performs the interpolation processing carries out a smooth zooming operation at a constant increasing rate to a high zoom magnification.

The display processing of displaying the pickup angle of view of the optical zoom and the clipping angle of view of the electronic zoom on the finder unit 18 will be discussed next.

When the electronic zoom is operated as discussed above, the pickup angle of view that is a range to form images on all effective pixels on the image pickup device 8 is different from the output angle of view of the final image displayed on the display 13 or recorded on the recorder 14. Therefore, a range of the field of view of the finder unit optically set to match the pickup angle of view, as is, becomes different from the output angle of view.

The clipping angle of view is displayed for visual verification within the field of view of the finder unit 18 set to match the pickup angle of view.

Figure 23:
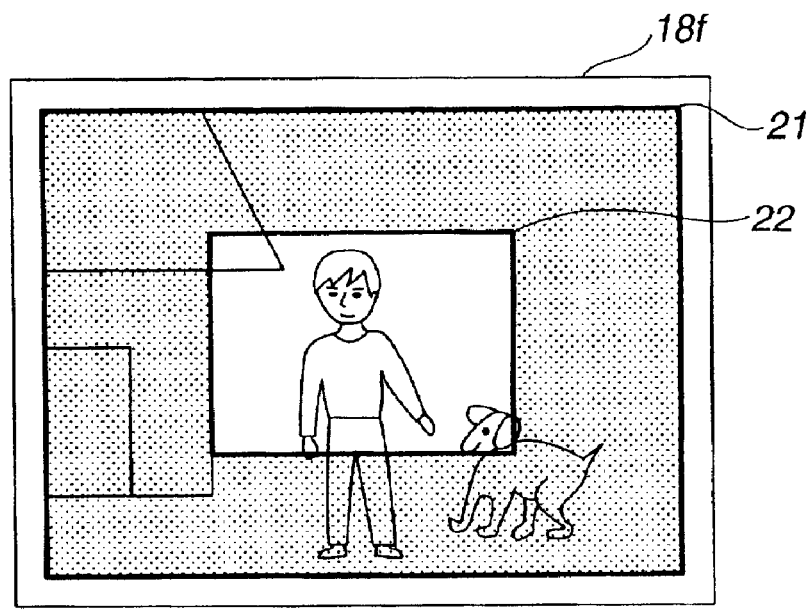
FIG. 23 illustrates a display device arranged in a finder unit for allowing the user to discriminate between a pickup angle of view and a clipping angle of view in the embodiment of the present invention.

FIG. 23 illustrates a display device arranged in a finder unit for discriminating between a pickup angle of view and a clipping angle of view.

In the image pickup apparatus with the finder optical system being a single lens reflex optical system as shown in FIG. 1, the subject image formed on the focusing screen of the finder unit 18 is automatically zoomed when the optical zooming is performed by the lens 1.

In the image pickup apparatus with the finder optical system being independent of the lens 1 as the image pickup optical system thereof as shown in FIG. 2, the digital processor 11 controls an unshown in-finder drive system when the optical zooming is performed by the lens 1. The digital processor 11 drives the objective lens group composed of the first lens 18b, the second lens 18c, and the third lens 18d. The subject images formed almost identical to the object image formed on the image pickup device 8 is thus observed.

When the optical zooming is performed, the pickup angle of view identical to the field of view formed focused on all effective pixels of the image pickup device is varied. The field of view of the finder unit 18 is substantially identical to the subject field by the pickup angle of view.

The angle of view modified in the course of the electronic zooming is not reflected in the field of view of the finder unit 18. The digital processor 11 controls the display device 18f, formed of a transmissive type LCD, in the finder unit 18, and controls to display difference between the field of view and the subject field by the modified angle of view in the electronic zooming.

The display device 18f includes an area 21 subtending the pickup angle of view, and a second area 22 subtending the clipping angle of view. The display device 18f modifies the light transmissivity in an area inside the first area 21 excluding the second area 22 by controlling the voltage applied to a liquid crystal.

When the electronic zoom zooms in toward the telephoto side, the light transmissivity of the area that is inside the first area 21 excluding the second area 22 is reduced. The luminance of an object image in that area appears reduced, and the clipping angle of view is thus high-lighted.

When the electronic zoom zooms out toward the wide-angle side with the clipping angle of view coinciding with the pickup angle of view, the light transmissivity of the area inside the first area 21 excluding the second area 22 is increased. Specifically, the digital processor 11 thus controls the display device 18f to raise the light transmissivity of the area inside the first area 21 excluding the second area 22 to make same with the light transmissivity of the inside of the second area 22.

When the clipping angle of view is modified into multiple steps, or modified continuously, the second area 22 is also modified accordingly.

The pickup angle of view of the optical zoom is checked within the field of view, while the clipping angle of view of the electronic zoom is easily and distinctly recognized on the screen, separately from the pickup angle of view.

Since the display device incorporating the LCD is employed, the luminance difference between the clipping angle of view and the pickup angle of view is controlled to a desired value by controlling the light transmissivity. When the photographer operates the operation unit 17, a desired transmissivity may be set. Specifically, transmissivity is quantized into several levels, and each time a button or the like is pressed, transmissivity levels are toggled.

The display device such as the LCD is used to differentiate between the clipping angle of view and the pickup angle of view in the above discussion. The present invention is not limited to this arrangement. Alternatively, a mechanically driven screen plate, which is typically used to switch to panorama images in a camera, may be used.

In this case, the screen plate is mounted at the position of the display device 18f instead of the display device 18f. The digital processor 11 controls the screen plate in response to the status of the electronic zoom.

Referring to FIG. 18, the clipping angle of view is shifted within the pickup angle of view when the optical axis is deviated from the center position of the image pickup device. In such a case, the area where the light transmissivity therewithin is modified is preferable to be changed to agree with the clipping angle of view.

Figure 24:
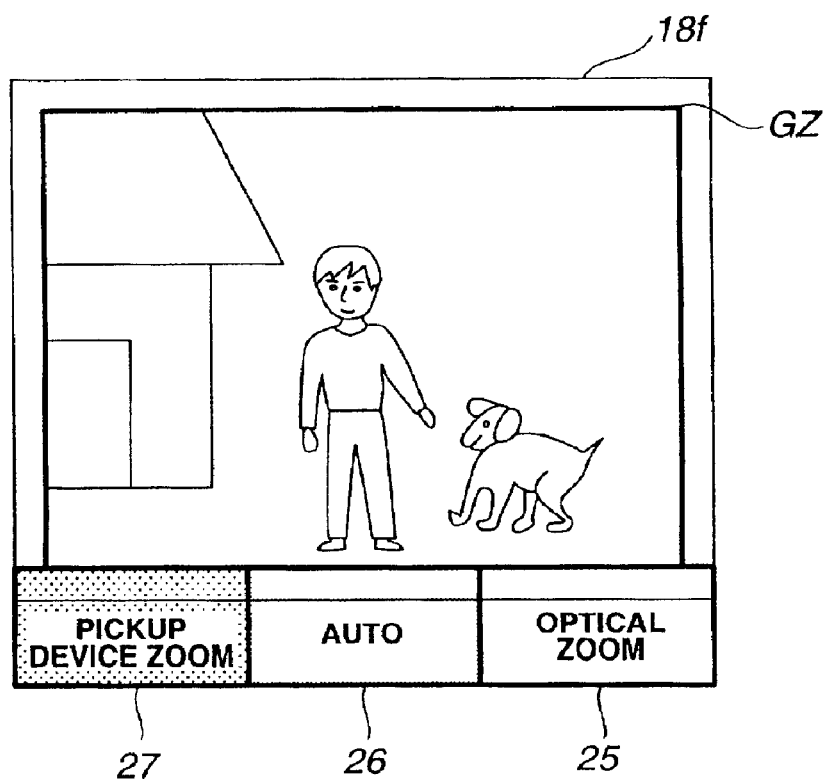
FIG. 24 illustrates a field of the finder unit when the zooming operation is switched in response to the detection of a line of sight in the above embodiment.

FIG. 24 illustrates a field of the finder unit when the zooming operation is switched in response to the detection of sight line.

The display device 18f includes an area GZ in which a subject image is presented. Provided below the area GZ are an image pickup device zoom selection command area 27, an automatic zoom selection command area 26, and an optical zoom selection command area 25.

The finder unit 18 includes a line-of-sight detector (not shown). The line-of-sight detector detects the line of sight of the photographer who may look into any of the image pickup device zoom selection command area 27, the automatic zoom selection command area 26, and the optical zoom selection command area 25. Line of sight information obtained is input to the digital processor 11, which in turn selects the zooming operation in response to the line of sight command.

When the photographer looks into the automatic zoom selection command area 26, an automatic zoom mode is selected to perform the optical zooming and the electronic zooming (image pickup device zooming) in combination. The digital processor 11 thus controls and carries out the automatic zooming operation.

When the photographer looks into the image pickup device zoom selection command area 27, the electronic zoom mode for performing the electronic zooming only is selected with the optical zoom disabled. The digital processor 11 thus controls and carries out the electronic zooming operation.

When the photographer looks into the optical zoom selection command area 25, the optical zoom mode for performing the optical zooming only is selected with the electronic zoom disabled. The digital processor 11 thus controls and carries out the optical zooming operation. This mode is appropriate for obtaining a high-definition output image such as in still picture taking. Specifically, when a still picture recording mode is set, the electronic zoom mode is disabled while the optical zoom mode is enabled.

The zoom mode switching using the line of sight may apply to the arrangement illustrated in FIG. 23. For example, during a mode setting status, the image pickup apparatus is switched to the electronic zoom when the photographer looks into the second area 22. The image pickup apparatus is switched to the optical zoom when the photographer looks into the area inside the first area 21 excluding the second area 22.

The image pickup apparatus has a simple configuration and the ease of use by combining the zoom operation member 3a mounted on the lens unit 19 and the zoom operation member 17a mounted on the body of the apparatus.

Since the image pickup device of this embodiment is a random-access X-Y address type image pickup device in which any pixel is read, all pixels are read.

The image pickup apparatus works in a first mode in which the electronic zoom is used to display a moving picture on the display 13 or to record the moving picture on the recorder 14, or in a second mode in which all pixels are read to record a high-definition still picture. The user appropriately selects between the first mode and the second mode.

The operation modes may be switched as discussed below, for example.

First, a two-step pressure photograph button may be included in the operation unit 17 to input a command to photograph. When the button is not pressed, the image pickup apparatus is set to the first mode. When the button is pressed by a half stroke, the image pickup apparatus performs an AE (automatic exposure) or an AF (automatic focusing) in the first mode. When the button is pressed by one full stroke, the image pickup apparatus is set to the second mode, thereby reading all pixels to take a high-definition still picture.

Second, an operation member for switching photographing modes may be arranged in the operation unit 17 to allow the photographer to set to a desired mode. Specifically, the operation member is formed of a pressure button such as a one-shot button for switching zoom modes. Only when the button is pressed, the second mode is set to take a still picture.

Third, the operation unit 17 may include a still/moving picture button switch for switching between a moving picture recording (viewing) mode and a still picture recording mode. When the moving picture recording mode is set, the first mode is selected. When the still picture recording mode is set, the second mode is selected. With the second mode selected, the image pickup apparatus is switched to the optical zoom that provides the same angle of view as the output angle of view of the image by the electronic zoom.

In accordance with the image pickup device of the present invention, a wide range of zooming is performed with a high resolution.

Since the image pickup apparatus controls the electronic zoom and the optical zoom in combination, a wide range of zooming is performed with a high resolution.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus having a zoom function, comprising:
   an X-Y address type image pickup device which photoelectrically converts an image of a subject image formed by an optical element with two-dimensionally arranged pixels, and outputs a picture signal reading from the pixels a charge into which the image is photoelectrically converted, wherein the image pickup device designates a position in the two-dimensionally arranged pixels by a combination of an X address and a Y address;

optical zoom means which performs optical zooming by changing a pickup angle of view which becomes the field of the subject image formed on the image pickup device;

electronic zoom means which performs electronic zooming by changing a clipping angle of view which is a clipping range of the pickup angle of view, wherein an address range formed of a combination of a range designated by an X address and a range designated by a Y address is changed when the pixels of the image pickup device are read; and control means which controls a combination of the electronic zooming by the electronic zoom means and the optical zooming by the optical zoom means to obtain a zoom range of an output angle of view of a finally output picture signal.

2. The image pickup apparatus according to claim 1, wherein the electronic zoom means increases, with the address range expanding, a skip-read-out rate at which a single pixel per m×n pixels of the image pickup device is read (m and n are natural numbers).

3. The image pickup apparatus according to claim 1, wherein the electronic zoom means moves the address range with respect to the image pickup device so that the center of the clipping angle of view is aligned with the optical axis of the optical element.

4. The image pickup apparatus according to claim 1, wherein the control means has the electronic zooming by the electronic zoom means and the optical zooming by the optical zoom means alternated sequentially.

5. The image pickup apparatus according to claim 1, further comprising operation means for inputting an instruction to start and end a zooming operation and a zooming direction representing whether the zooming operation is performed in the telephoto direction or the wide-angle direction, wherein the control means has the electronic zoom means perform the zooming operation with a priority placed thereon when the zooming direction input by the operation means is executable by any of the electronic zoom means and the optical zoom means, and has the optical zoom means perform the zooming operation in place of the electronic zoom means when the electronic zoom means reaches one of a telephoto end and a wide-angle end within an electronic zoom range taken by the electronic zoom means, wherein the telephoto end is the limit in the telephoto direction and the wide-angle end is the limit in the wide-angle direction.

6. The image pickup apparatus according to claim 5, wherein the control means drives the optical zoom means in parallel with the operation of the electronic zoom means so that the output angle of view at the end of the zooming operation by the operation means becomes a predetermined clipping angle of view within the zoom range of the electronic zoom means.

7. The image pickup apparatus according to claim 6, wherein the predetermined clipping angle of view is an intermediate angle of view between the telephoto end and the wide-angle end within the electronic zoom range.

8. The image pickup apparatus according to claim 6, wherein the predetermined clipping angle of view is at the telephoto end within the electronic zoom range.

9. The image pickup apparatus according to claim 6, wherein the predetermined clipping angle of view is at the wide-angle end within the electronic zoom range.

10. The image pickup apparatus according to claim 1, wherein the electronic zoom means updates a skip-read-out rate at which a single pixel per m×n pixels of the image pickup device (m and n are natural numbers) is read, and switches over sequentially from a first clipping angle of view to a second clipping angle of view different from the first clipping angle of view, thereby performing discontinuous zooming, and wherein the control means sets the clipping angle of view to one of the first clipping angle of view and the second clipping angle of view, while controlling the pickup angle of view, thereby performing continuous zooming with any output angle of view.

11. The image pickup apparatus according to claim 10, wherein for a switching period within which the control means switches between the first clipping angle of view and the second clipping angle of view, the control means varies the pickup angle of view toward the direction in which a change in the output angle of view attributed to the switching of the clipping angle of view is cancelled.

12. The image pickup apparatus according to claim 11, wherein the control means varies the pickup angle of view by a change which substantially cancels a change in the output angle of view attributed to the switching of the clipping angle of view by the electronic zoom means.

13. The image pickup apparatus according to claim 12, wherein the control means sets, as a change of point in the clipping angle of view and a change of point in the pickup angle of view, the point where the amount of change in the pickup angle of view of the optical zoom means when the control means switches between the first clipping angle of view and the second clipping angle of view coincides with the amount of change in the pickup angle of view of the optical zoom means when the control means switches between a third clipping angle of view, different from any of the first and second clipping angle of view, and the second clipping angle of view.

14. The image pickup apparatus according to claim 11, further comprising storage means for temporarily storing pixel information read from the image pickup device on a frame by frame basis, wherein the control means controls the storage means to store therewithin the pixel information that is read immediately prior to the switching period and then to repeatedly read picture information based on the pixel information stored in the storage means instead of reading the pixel information from the image pickup device.

15. The image pickup apparatus according to claim 14, wherein the picture information based on the pixel information stored in the storage means is the pixel information itself stored in the storage means.

16. The image pickup apparatus according to claim 14, wherein the picture information based on the pixel information stored in the storage means is picture information at a different angle of view which is obtained by interpolating the pixel information stored in the storage means.

17. The image pickup apparatus according to claim 16, wherein the different angle of view is set so that the output angle of view in the zooming direction continuously changes immediately prior to the switching period.

18. The image pickup apparatus according to claim 16, wherein the electronic zoom means maintains an address range related to a clipping angle of view immediately prior to the switching period when the zooming operation is in the telephoto direction, and sets an address range related to a wide clipping angle of view including a clipping angle of view immediately subsequent to the switching period when the zooming operation is in the wide-angle direction; and wherein the storage means stores the pixel information within the address range set by the electronic zoom means.

19. The image pickup apparatus according to claim 1, wherein the electronic zoom means updates a skip-read-out rate at which a single pixel per m×n pixels of the image pickup device (m and n are natural numbers) is read, and switches over from a first clipping angle of view to a second clipping angle of view different from the first clipping angle of view, and determines angle of view information related to an angle of view between the first clipping angle of view and the second clipping angle of view by interpolating the pixel information read from the image pickup device, and wherein the control means causes the electronic zoom means and the optical zoom means to work in parallel, and updates a change of speed of the pickup angle of view of the optical zoom means in accordance with the progress of the interpolation processing so that the output angle of view changes at a constant rate of increase.

20. The image pickup apparatus according to claim 1, further comprising:

an optical finder for viewing the image of a subject within a field including the pickup angle of view, and in-finder display means, arranged in the optical path of the optical finder, for displaying, in a visually recognizable fashion, an area approximately corresponding to the output angle of view within the image of the subject viewed through the optical finder.

21. The image pickup apparatus according to claim 20, further comprising:

line-of-sight detector means for detecting the line of sight of the eyes of a viewer viewing the subject through the optical finder, and zoom mode switching means for setting at least one of the electronic zooming and the optical zooming based on the results of detection of the line of sight provided by the line-of-sight detector means.

22. The image pickup apparatus according to claim 1, wherein a still picture recording mode for recording a still picture as a high-definition picture is enabled, and wherein the control means activates the optical zooming only with the electronic zooming inhibited when the still picture recording mode is enabled.

* * * * *